(12) United States Patent
Muquit

(10) Patent No.: US 8,831,296 B2
(45) Date of Patent: Sep. 9, 2014

(54) BIOMETRIC AUTHENTICATION APPARATUS, BIOMETRIC AUTHENTICATION METHOD, AND PROGRAM

(75) Inventor: Mohammad Abdul Muquit, Tokyo (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 12/931,021

(22) Filed: Jan. 21, 2011

(65) Prior Publication Data

US 2011/0188710 A1 Aug. 4, 2011

(30) Foreign Application Priority Data

Jan. 29, 2010 (JP) ................. P2010-019084

(51) Int. Cl.
*G06K 9/00* (2006.01)
(52) U.S. Cl.
CPC ....................... *G06K 9/00* (2013.01)
USPC ........... 382/124; 382/115; 382/116; 382/117; 382/118
(58) Field of Classification Search
USPC ................................. 382/115–188
See application file for complete search history.

(56) References Cited

U.S. PATENT DOCUMENTS

| | | | | |
|---|---|---|---|---|
| 8,103,060 | B2 * | 1/2012 | Abe ............................. | 382/115 |
| 8,428,317 | B2 * | 4/2013 | Kimia et al. .................. | 382/128 |
| 2004/0022421 | A1 * | 2/2004 | Endoh et al. .................. | 382/115 |
| 2007/0036400 | A1 * | 2/2007 | Watanabe et al. ............. | 382/124 |
| 2007/0217660 | A1 * | 9/2007 | Komura et al. ............... | 382/115 |
| 2008/0037834 | A1 * | 2/2008 | Abe ............................. | 382/115 |
| 2009/0175505 | A1 | 7/2009 | Muquit et al. | |
| 2009/0285453 | A1 | 11/2009 | Muquit et al. | |
| 2011/0103657 | A1 * | 5/2011 | Kang et al. .................... | 382/128 |

FOREIGN PATENT DOCUMENTS

JP 2009-187520 A 8/2009

* cited by examiner

*Primary Examiner* — Jayesh A Patel
(74) *Attorney, Agent, or Firm* — Sony Corporation

(57) ABSTRACT

There is provided a biometric authentication apparatus including a vein image extraction unit for extracting a vein image showing positions of veins from an image including veins in a finger portion, a vein image dividing unit for dividing the extracted vein image into a plurality of partial regions, a vein pixel counting unit for counting the number of pixels corresponding to the veins in each of the divided partial regions, a vector generation unit for arranging, in a predetermined order, count results of the respective partial regions, and generating a vein distribution vector, which is a numerical sequence representing a degree of distribution of the veins in the vein image, and an authentication unit for authenticating the vein distribution vector generated by the vector generation unit, based on a registered vein distribution vector, which is a vein distribution vector registered in advance.

7 Claims, 14 Drawing Sheets

CORRECTED VEIN IMAGE

NON-PROCESSED REGION

COUNT RESULT IN EACH PARTIAL REGION (BLOCK)

ARRANGEMENT ORDER

VEIN DISTRIBUTION VECTOR

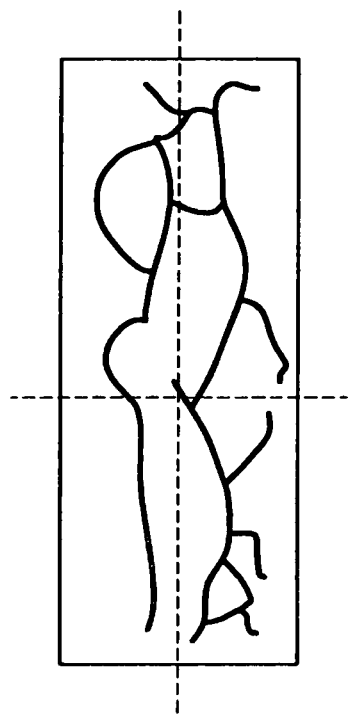 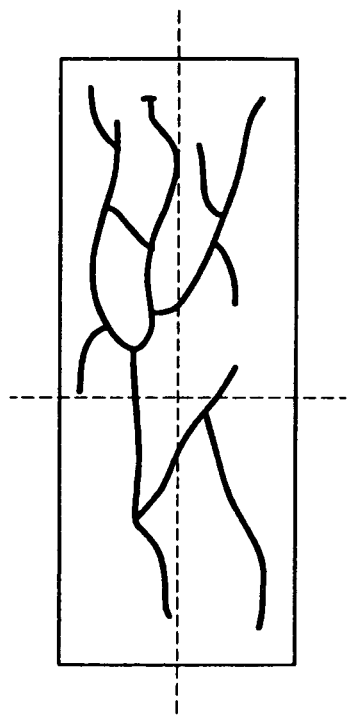
FIG. 17A  FIG. 17B

BIOMETRIC AUTHENTICATION APPARATUS, BIOMETRIC AUTHENTICATION METHOD, AND PROGRAM

CROSS-REFERENCE TO RELATED APPLICATION

The present application claims priority from Japanese Patent Application No. JP 2010-019084 filed in the Japanese Patent Office on Jan. 29, 2010, the entire content of which is incorporated herein by reference.

BACKGROUND OF THE INVENTION

1. Field of the Invention

The present invention relates to a biometric authentication apparatus, a biometric authentication method, and a program.

2. Description of the Related Art

Individual identification techniques using biometric authentication (biometrics) have come to be used recently. In the individual identification techniques using biometric authentication (hereinafter referred to as biometric authentication), biometric authentication data used for authentication are registered in advance as templates, and in the authentication, the previously registered templates are collated with biometric authentication data generated during authentication.

One of such biometric authentications includes a finger vein authentication using a running pattern of a vein in a finger. A volume of blood vessel (vein) in a finger varies for each person. Moreover, even in the same person, a vascular volume of each finger is different. Therefore, in Japanese Patent Application Laid-Open No. 2009-187520, a technique for distinguishing a person in view of a vascular volume in an entire finger is considered.

SUMMARY OF THE INVENTION

By the way, in blood vessels (veins) in a certain finger, a vascular volume varies depending on a portion of the finger. However, in the technique described in Japanese Patent Application Laid-Open No. 2009-187520, attention is given to a vascular volume in an entire finger, and therefore, there is an issue in that templates subjected to collation may not be sufficiently narrowed down.

In view of the foregoing, it is desirable to provide a biometric authentication apparatus, a biometric authentication method, and a program capable of further narrowing down the number of templates subjected to collation.

According to an embodiment of the present invention, there is provided a biometric authentication apparatus including a vein image extraction unit for emitting a light having a predetermined wavelength to a finger portion and extracting a vein image showing positions of veins from an image including veins in the obtained finger portion, a vein image dividing unit for dividing the vein image extracted by the vein image extraction unit into a plurality of partial regions, a vein pixel counting unit for counting the number of pixels corresponding to the veins in each of the partial regions divided by the vein image dividing unit, a vector generation unit for arranging, in a predetermined order, count results of the respective partial regions provided by the vein pixel counting unit, and generating a vein distribution vector, which is a numerical sequence representing a degree of distribution of the veins in the vein image, and an authentication unit for authenticating the vein distribution vector generated by the vector generation unit, based on a registered vein distribution vector, which is a vein distribution vector registered in advance.

It is preferable that while one of the vein distribution vector generated by the vector generation unit and the registered vein distribution vector is repeatedly shifted by a predetermined number of elements, the authentication unit calculates a degree of similarity between the vein distribution vector generated by the vector generation unit and the registered vein distribution vector.

The biometric authentication apparatus may further include an image correction unit for correcting the vein image by performing at least one of a parallel moving processing and a rotation processing on the vein image extracted by the vein image extraction unit. The image correction unit may perform a principal component analysis on the not-yet-corrected vein image, and rotates the not-yet-corrected vein image such that a direction of a first principal component is in parallel with a side in a longitudinal direction of the vein image. The image correction unit calculates a barycenter of a distribution of pixels corresponding to the positions of the veins in the not-yet-corrected vein image, and moves the not-yet-corrected vein image in parallel such that the barycenter matches a central position of the vein image.

The vein image dividing unit may divide a predetermined region of the vein image including a central position of the vein image into a plurality of partial regions.

The vector generation unit may arrange the count results in order from a partial region located at a corner of the vein image.

The vector generation unit may arrange the count results in order from a partial region including a central position of the vein image.

The authentication unit may perform an authentication processing based on an element of the vein distribution vector corresponding to a partial region including a central position of the vein image.

According to another embodiment of the present invention, there is provided a biometric authentication method including the steps of emitting a light having a predetermined wavelength to a finger portion and extracting a vein image showing positions of veins from an image including veins in the finger portion from which the image has been obtained, dividing the extracted vein image into a plurality of partial regions, counting the number of pixels corresponding to the veins in each of the generated partial regions, arranging, in a predetermined order, count results of the respective partial regions, and generating a vein distribution vector, which is a numerical sequence representing a degree of distribution of the veins in the vein image, and authenticating the vein distribution vector generated in the step of generating the vector, based on a registered vein distribution vector, which is a vein distribution vector registered in advance.

According to another embodiment of the present invention, there is provided a program causing a computer to realize a vein image extraction function for emitting a light having a predetermined wavelength to a finger portion and extracting a vein image showing positions of veins from an image including veins in the finger portion from which the image has been obtained, a vein image dividing function for dividing the vein image extracted by the vein image extraction function into a plurality of partial regions, a vein pixel counting function for counting the number of pixels corresponding to the veins in each of the partial regions divided by the vein image dividing function, a vector generation function for arranging, in a predetermined order, count results of the respective partial regions provided by the vein pixel counting function, and generating a vein distribution vector, which is a numerical sequence representing a degree of distribution of the veins in the vein image, and an authentication function for authenticating the vein distribution vector generated by the vector generation function, based on a registered vein distribution vector, which is a vein distribution vector registered in advance.

As hereinabove explained, according to the present invention, the number of templates subjected to the collation can be further narrowed down by using the vein distribution vector generated while attention is given to a partial distribution of veins in a finger.

BRIEF DESCRIPTION OF THE DRAWINGS

FIG. 17A is an explanatory diagram for illustrating an example of a distribution of veins in a finger; and FIG. 17B is an explanatory diagram for illustrating an example of a distribution of veins in a finger.

DETAILED DESCRIPTION OF THE EMBODIMENT

Figure 1:
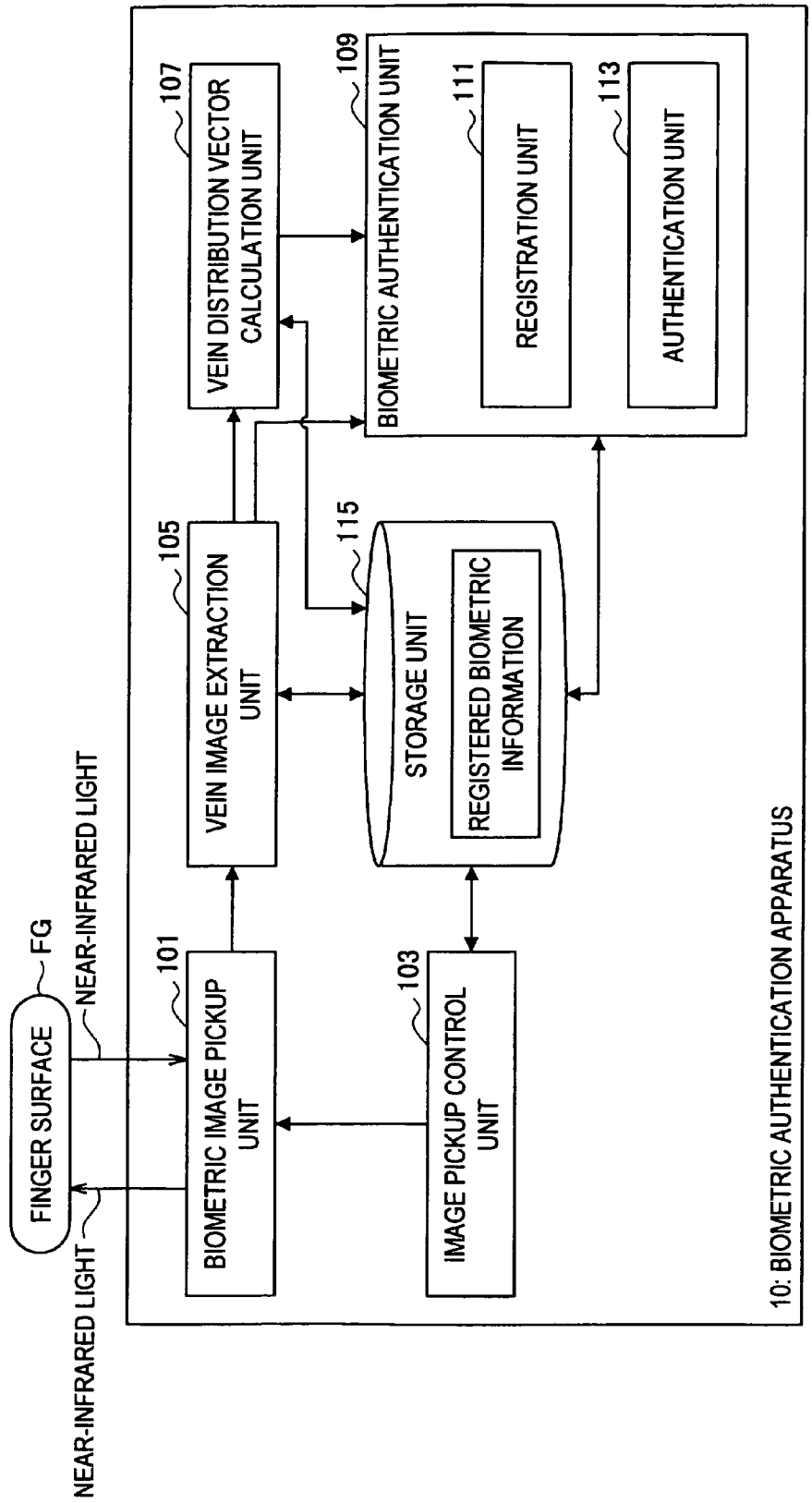
FIG. 1 is a block diagram illustrating a configuration of a biometric authentication apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the order listed below.
(1) Purpose
(2) First embodiment
(2-1) Regarding configuration of biometric authentication apparatus
(2-2) Regarding biometric authentication method
(2-3) Example
(3) Regarding hardware configuration of biometric authentication apparatus according to the embodiment of the present invention
(4) Summary Purpose Before explaining a biometric authentication apparatus and a biometric authentication method according to an embodiment of the present invention, a purpose of the present invention will be briefly explained with reference to FIGS. 17A and 17B. Each of FIGS. 17A and 17B is an explanatory diagram for illustrating an example of a distribution of veins in a finger.

Each of FIGS. 17A and 17B is a finger vein image illustrating a running pattern of veins in a finger. In FIGS. 17A and 17B, portions corresponding to veins are represented by black pixels. As can be seen from the figures, the number of pixels corresponding to finger veins in FIG. 17A are substantially the same as the number of pixels corresponding to finger veins in FIG. 17B.

In biometric authentication processing, all registered templates (registered biometrics information) are collated with input biometrics information in order to authenticate the input biometrics information. At this occasion, processing is performed in advance to reduce the number of templates subjected to collation by using metadata such as a vascular volume of a finger.

However, in biometric authentication processing in which the number of templates subjected to collation is reduced in view of a volume of veins in an entire finger, the templates as shown in FIGS. 17A and. 17B are both selected as candidates to be collated with the input biometrics information (finger vein image). As a result, it may be difficult to sufficiently narrow down the templates to be collated.

Now, a case will be considered where each finger vein image is divided into four partial regions by dotted lines as shown in FIGS. 17A and 17B. In this case, in the finger vein image as shown in FIG. 17A, many veins are distributed in partial regions located at the upper right and the lower right, but in the finger vein image as shown in FIG. 17B, many veins are distributed in a partial region located at the upper left. Therefore, the finger vein images having almost the same vascular volume can be further classified in more details by dividing the finger vein image into several partial regions and studying the distribution of blood vessels in each partial region. It is considered that a finger vein image can be classified more accurately when this number of divisions is increased.

As a result of assiduous study, the present inventor has conceived of sufficiently narrowing down the number of templates subjected to collation by dividing a finger vein image into a plurality of partial regions and generating information representing a volume of finger veins in each partial region. In the explanation below, a biometric authentication apparatus and a biometric authentication method capable of sufficiently narrowing down the number of templates subjected to collation will be explained in more details.

First Embodiment

<Regarding Configuration of Biometric Authentication Apparatus>

First, a configuration of a biometric authentication apparatus 10 according to a first embodiment of the present invention will be explained in details with reference to FIG. 1. FIG. 1 is a block diagram illustrating the configuration of the biometric authentication apparatus 10 according to the present embodiment.

For example, as shown in FIG. 1, the biometric authentication apparatus 10 according to the present embodiment mainly includes a biometrics image pickup unit 101, an image pickup control unit 103, a vein image extraction unit 105, a vein distribution vector calculation unit 107, a biometric authentication unit 109, and a storage unit 115.

The biometrics image pickup unit 101 includes a light source unit and an optical system. The light source unit emits near-infrared light having a predetermined wavelength band onto a surface of a finger (which may be hereinafter referred to as body surface) FG. The optical system is constituted by optical elements such as an image pickup device and lenses.

The near-infrared light has such characteristics that it is well transmitted through body tissues and absorbed by hemoglobin (reduced hemoglobin) in blood. Therefore, if the near-infrared light is emitted onto a finger, a palm or the back of a hand, veins distributed inside the finger, the palm or the back of the hand appear as a shadow in an image. The shadow of veins that appears in the image is called a vein pattern. In order to preferably pick up an image of such a vein pattern, the light source unit such as a light emitting diode emits near-infrared light having a wavelength of about 600 nm to 1300 nm, preferably, about 700 nm to 900 nm.

If the wavelength of the near-infrared light emitted by the light source is less than 600 nm or more than 1300 nm, a less percentage of light is absorbed by hemoglobin in blood, and it becomes difficult to obtain a good vein pattern. Also, if the wavelength of the near-infrared light emitted by the light source is about 700 nm to 900 nm, the near-infrared light is specifically absorbed by both deoxygenated hemoglobin and oxygenated hemoglobin, and it is therefore possible to obtain a good vein pattern.

The near infrared light emitted from the light source is propagated toward a surface of a living body portion, and enters the inside from a side surface and the like of a living body as a direct light. Since a human body is a good scatterer of near infrared light, the direct light that has entered the living body propagates while scattering in all directions. The near infrared light that has passed through the living body enters the optical element constituting the optical system.

The optical system constituting the biometrics image pickup unit 101 is constituted by one or a plurality of optical elements, and one or a plurality of image pickup devices.

Human skin is known to have a three-layer structure including an epidermis layer, a dermis layer and a subcutaneous tissue layer. A vein layer including veins is in the dermis layer. The dermis layer is located about 0.1 mm to 0.3 mm below the finger surface and has a thickness of about 2 mm to 3 mm. Thus, a light transmitted through the vein layer can be efficiently condensed when a focal position of the optical element such as the lens is set to a position where the dermis layer exists (e.g. at a position about 1.5 mm to 2.0 mm below the finger surface).

The transmitted light having passed through the vein layer is condensed by an optical element to form an image on an image pickup device such as a CCD and a CMOS, which produces vein image pickup data. The vein image pickup data thus generated are transmitted to the after-mentioned vein image extraction unit 105.

The image pickup control unit 103 is realized with, for example, a CPU (Central Processing Unit), a ROM (Read Only Memory), a RAM (Random Access Memory), and the like. The image pickup control unit 103 generates image pickup data by controlling the light source unit, the optical system, and the image pickup device. More specifically, the image pickup control unit 103 picks up an image of a body surface and generates image pickup data by controlling the light source unit, the optical system, and the image pickup device.

The image pickup control unit 103 outputs the image pickup data generated by the image pickup device to the after-mentioned vein image extraction unit 105. Further, the image pickup control unit 103 may record the obtained image pickup data in the after-mentioned storage unit 115 and the like. When the image pickup data are recorded in the storage unit 115 and the like, the image pickup control unit 103 may associate the generated image pickup data with date of an image pickup, a time of the image pickup, and the like. It should be noted that the generated image pickup data may be an RGB (Red-Green-Blue) signal, or may be image data of other colors such as grayscale.

The vein image extraction unit 105 is realized with, for example, a CPU, a ROM, a RAM, and the like. The vein image extraction unit 105 extracts biometrics information (vein image) representing the user's vein pattern from among image pickup data transmitted from the biometrics image pickup unit 101. This vein image extraction unit 105 further includes processing units such as an image smoothing unit, an outline extraction unit, a mask image generation unit, a cropping unit, a vein smoothing unit, a binary conversion unit, a thick line conversion unit, a thin line conversion unit, a thumbnail image generation unit, and the like.

The image smoothing unit is realized with, for example, a CPU, a ROM, a RAM, and the like. The image smoothing unit uses, for example, a so-called Gaussian spatial filter to filter the vein image pickup data transmitted from the biometrics image pickup unit 101, thus smoothing the vein image corresponding to the vein image pickup data.

The outline extraction unit is realized with, for example, a CPU, a ROM, a RAM, and the like. The outline extraction unit uses, for example, a so-called Log (Laplacian of Gaussian) spatial filter to filter the vein image smoothed by the image smoothing unit, thus emphasizing the outline of the vein image to produce an engraved image.

The mask image generation unit is realized with, for example, a CPU, a ROM, a RAM, and the like. The mask image generation unit extracts an outline such as an outline of a finger, based on a contrast with respect to a background section, from the vein image whose outline has been emphasized by the outline extraction unit. Further, the mask image generation unit generates an image (which may also be referred to as a mask image) that represents, using binary values, a finger region enclosed by the detected outline and a region other than the finger region.

The cropping unit is realized with, for example, a CPU, a ROM, a RAM, and the like. The cropping unit uses the mask image generated by the mask image generation unit to crop out an image of a predetermined size including the finger region enclosed by the outline of the finger from the vein image whose outline has been emphasized by the outline extraction unit.

The vein smoothing unit is realized with, for example, a CPU, a ROM, a RAM, and the like. The vein smoothing unit uses, for example, a so-called median spatial filter to filter the vein image cropped out by the cropping unit, thus smoothing the vein section in the vein image.

The binary conversion unit is realized with, for example, a CPU, a ROM, a RAM, and the like. The binary conversion unit converts the vein image in which the vein section is smoothed by the vein smoothing unit into binary levels, using a configured brightness level as a reference. Now, if a vein image in which veins have not yet been smoothed is adopted as an image to be subjected to the binary conversion, it is more likely that one vein may be separated into two veins as a result of the binary conversion process even though there is only one vein in reality. On the other hand, when a vein image in which veins are smoothed is adopted as an image to be subjected to the binary conversion process, the binary conversion process can be carried out while the binary values are close to the actual vein.

The thick line conversion unit is realized with, for example, a CPU, a ROM, a RAM, and the like. The thick line conversion unit uses, for example, a so-called dilation spatial filter to filter the vein image converted into binary values by the binary conversion unit, thus making veins in the vein image into thicker lines. As a result, this filter connects disconnected vein sections which should be connected in reality.

The thin line conversion unit is realized with, for example, a CPU, a ROM, a RAM, and the like. The thin line conversion unit uses, for example, a so-called erosion spatial filter to filter the vein image in which the vein sections are converted into thick lines by the thick line conversion unit, thus making the widths of the veins in the vein section constant.

The thumbnail image generation unit is realized with, for example, a CPU, a ROM, a RAM, and the like. The thumbnail image generation unit obtains from the thin line conversion unit the vein image that represents, using binary values, the vein section in which the widths of the veins are constant and the background section, and generates a thumbnail image from this vein image by compressing the vertical and horizontal sizes by one n-th.

In this way, the vein image extraction unit 105 extracts, as a biometrics image, the image representing, using binary values, the vein section in which the widths of the veins are constant and the background section, and generates a thumbnail image of the biometrics image. The vein image extraction unit 105 transmits the vein image extracted from the vein image pickup data and metadata such as a thumbnail image to the vein distribution vector calculation unit 107 and the biometric authentication unit 109, which are explained later. It should be noted that the vein image extraction unit 105 may record, in the after-mentioned storage unit 115, the extracted vein image and the like in association with identification information (for example, identification number) unique to the above information.

The vein distribution vector calculation unit 107 is realized with, for example, a CPU, a ROM, a RAM, and the like. The vein distribution vector calculation unit 107 uses the vein image transmitted from the vein image extraction unit 105 to calculate a vein distribution vector, i.e., a numerical sequence representing the degree of distribution of veins in the vein image. The vein distribution vector calculation unit 107 will be explained later in detail again.

The biometric authentication unit 109 is realized with, for example, a CPU, a ROM, a RAM, and the like. The biometric authentication unit 109 is a processing unit for performing biometric authentication processing by using the vein image extracted by the vein image extraction unit 105, the vein distribution vector calculated by the vein distribution vector calculation unit 107, and the like. As shown in FIG. 1, this biometric authentication unit 109 further includes a registration unit 111 and an authentication unit 113.

The registration unit 111 is realized with, for example, a CPU, a ROM, a RAM, and the like. The registration unit 111 associates the vein distribution vector calculated by the vein distribution vector calculation unit 107 and the vein image extracted by the vein image extraction unit 105 with each other, and registers the vein distribution vector and the vein image as registered biometrics information in the storage unit 115 and the like. The registered vein image in the registered biometrics information is used as a template during a main authentication (final authentication) of an input vein image. On the other hand, the vein distribution vector having been registered (which may be hereinafter referred to as registered vein distribution vector) is used during a preliminary authentication (authentication for narrowing down the number of templates), which is performed before the main authentication.

It should be noted that, when the vein distribution vector or the vein image is registered, the registration unit 111 may compress the data by a bit compression processing and the like and register the compressed data in the storage unit 115 and the like.

The authentication unit 113 is realized with, for example, a CPU, a ROM, a RAM, and the like. The authentication unit 113 is a processing unit for authenticating input biometrics information by using the previously registered biometrics information. More specifically, the authentication unit 113 authenticates the vein distribution vector calculated by the vein distribution vector calculation unit 107 based on the registered vein distribution vector registered in advance. As a result of this authentication processing of the vein distribution vector, a registered vein distribution vector similar to the input vein distribution vector is identified. Therefore, the authentication unit 113 can narrow down the number of templates subjected to collation during the main authentication. Thereafter, the authentication unit 113 uses the registered vein image associated with the registered vein distribution vector having been successfully authenticated to perform authentication processing (main authentication processing) of the vein image extracted by the vein image extraction unit 105.

The authentication unit 113 calculates whether the input biometrics information is similar to the registered biometrics information or not based on the calculated degree of similarity. An example of the degree of similarity used for the determination is the degree of similarity using a summation of cross-correlation value or differences. Examples of the method using a summation of differences include Sum of Absolute Difference (SAD) and Sum of Squared Difference (SSD). The authentication unit 113 can use any kind of the degree of similarity according to the type of biometrics information to be authenticated. For an authentication of the vein distribution vector, it is preferable to use the degree of similarity using a summation of differences. For an authentication of the templates, it is preferable to use cross-correlation values.

When the vein distribution vector is authenticated, the authentication unit 113 determines whether a calculated value of SAD or SSD is equal to or less than a predetermined threshold value. When the calculated value is determined to be equal to or less than the threshold value, the authentication unit 113 determines that the authentication is successful. On the other hand, when the vein image is authenticated, the authentication unit 113 determines whether the calculated cross-correlation value is equal to or more than a predetermined threshold value. When the calculated value is determined to be equal to or more than the predetermined threshold value, the authentication unit 113 determines that the authentication is successful. The threshold value referenced during the authentication may be set in advance according to any method. For example, the threshold value is preferably set such that a false rejection rate is equal to or less than 1%.

It should be noted that the authentication processing of the vein distribution vector carried out by the authentication unit 113 will be explained later again in detail.

The storage unit 115 is an example of the storage device arranged in the biometric authentication apparatus 10 according to the present embodiment. In the storage unit 115, the registered biometrics information including the registered vein distribution vector and the templates are stored by the registration unit 111. In addition, the storage unit 115 may temporarily store the image pickup data generated by the biometrics image pickup unit 101, the vein image extracted by the vein image extraction unit 105, and the like. In addition, the storage unit 115 may store various kinds of history information such as history information about registration of biometrics information. Further, the storage unit 115 may store various parameters or progress of processing that are necessary to be stored while the biometric authentication apparatus 10 according to the present embodiment performs certain processing, and may store various kinds of databases and so on as necessary. The storage unit 115 can be freely read and written by the biometrics image pickup unit 101, the image pickup control unit 103, the vein image extraction unit 105, the vein distribution vector calculation unit 107, the biometric authentication unit 109, the registration unit 111, the authentication unit 113, and the like.

[Regarding Configuration of Vein Distribution Vector Calculation Unit]

Figure 2:
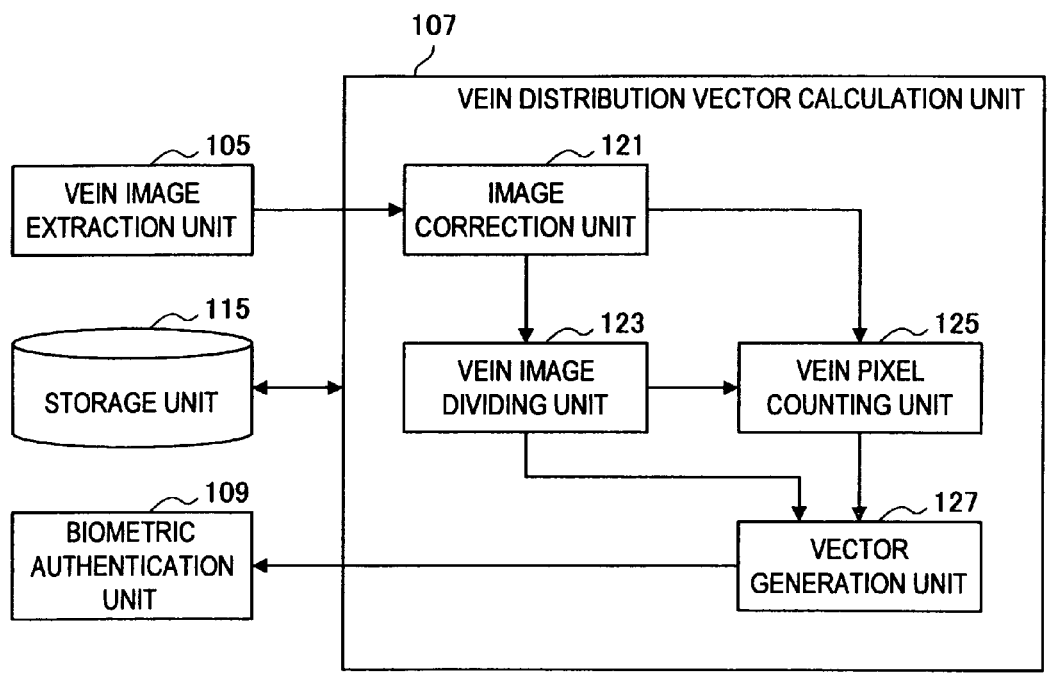
FIG. 2 is a block diagram illustrating a configuration of a vein distribution vector calculation unit according to the embodiment.

Subsequently, a configuration of the vein distribution vector calculation unit 107 according to the present embodiment will be explained in detail with reference to FIGS. 2 to 8. FIG. 2 is a block diagram illustrating the configuration of the vein distribution vector calculation unit 107 according to the present embodiment. FIGS. 3A to 8 are explanatory diagrams illustrating the vein distribution vector calculation unit 107 according to the present embodiment.

For example, as shown in FIG. 2, the vein distribution vector calculation unit 107 according to the present embodiment further includes an image correction unit 121, a vein image dividing unit 123, a vein pixel counting unit 125, and a vector generation unit 127.

The image correction unit 121 is realized with, for example, a CPU, a ROM, a RAM, and the like. The image correction unit 121 performs at least any one of parallel moving processing and rotation processing on the vein image extracted by the vein image extraction unit 105, thus correcting the vein image.

As explained below, the vein distribution vector used by the biometric authentication apparatus 10 according to the present embodiment represents the degree of distribution of a vein pattern in a vein image in a spatial domain. Therefore, even if the same finger of the same person is obtained as an image, a different vein image may be generated due to a different position or a different angle of a finger during image pickup. As a result, there is a possibility that a different vein distribution vector is calculated. Accordingly, the image correction unit 121 performs the parallel moving processing and the rotation processing on the extracted vein image, thus preventing decrease of the accuracy caused by such displacement.

Figure 3B:
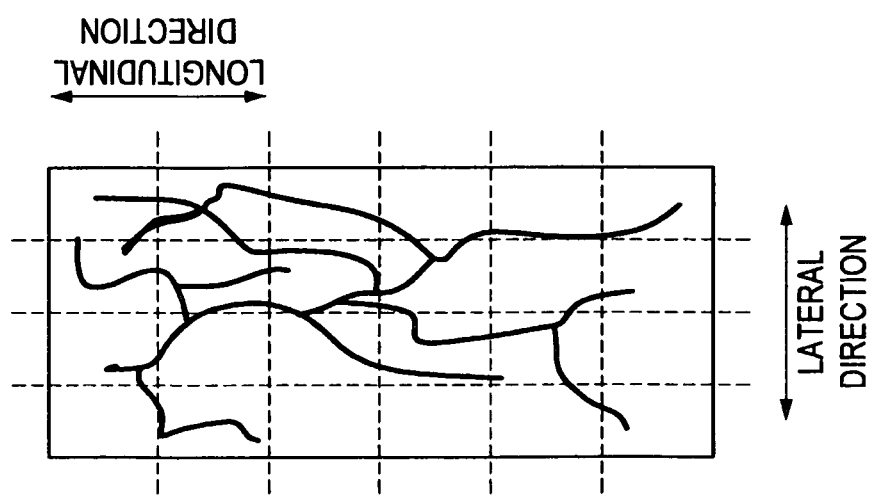
FIG. 3B is an explanatory diagram for illustrating the vein distribution vector calculation unit according to the embodiment.
Figure 3A:
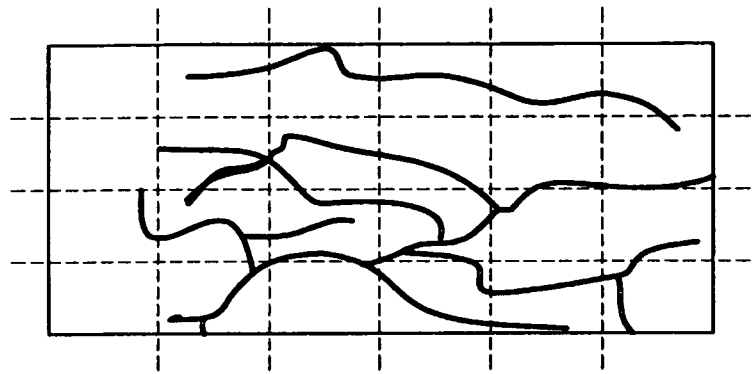
FIG. 3A is an explanatory diagram for illustrating the vein distribution vector calculation unit according to the embodiment.
Figure 4:
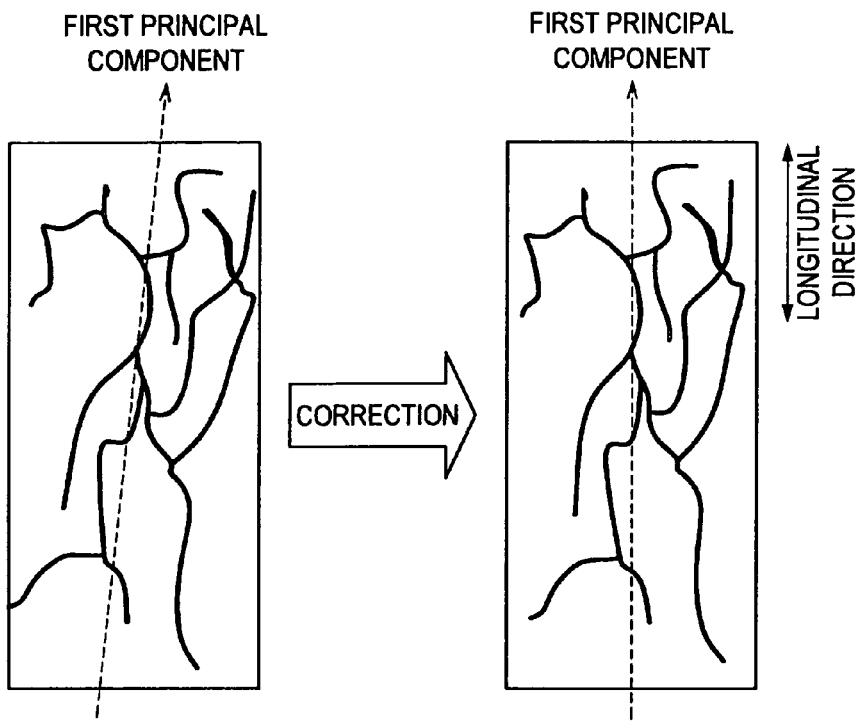
FIG. 4 is an explanatory diagram for illustrating the vein distribution vector calculation unit according to the embodiment.

In the explanation below, the meaning of the correction processing performed by the image correction unit 121' will be specifically explained while attention is given to the vein pattern shown in FIGS. 3A and 3B. It is assumed that each of the vein patterns shown in FIGS. 3A and 3B is a vein pattern of the same finger of the same person. The vein pattern shown in FIG. 3B is obtained by moving the vein pattern shown in FIG. 3A in a diagonally lower left direction in parallel. In FIG. 3B, it is assumed that a vein pattern not shown in FIG. 3A is included at a right end portion of an image frame.

In the calculation processing of the vein distribution vector explained below, a processing is first performed to divide a vein image into a plurality of partial regions. In FIGS. 3A and 3B, the vein image is divided into 6 parts in a longitudinal direction of the finger (i.e., a longitudinal direction of the image frame), and is divided into 4 parts in a lateral direction of the finger (i.e., a lateral direction of the image frame). As a result, the vein image is divided into 24 partial regions as shown in FIG. 3A and FIG. 3B.

Further, in the calculation processing of the vein distribution vector, when the vein image has been divided into the partial regions, the number of pixels corresponding to veins in each partial region is counted. The vein distribution vector calculation unit 107 uses count results of the pixels to generate a vein distribution vector.

Now, the vein patterns shown in FIGS. 3A and 3B are compared. As a result of the parallel movement, a vein pattern in a partial region second from the right and first from the top in FIG. 3A resides over a partial region third from the right and first from the top and a partial region third from the right and second from the top in FIG. 3B. As described above, when a vein pattern is moved in parallel, a spatial domain in which the pattern is observed is changed, even though the vein pattern is originally the same. This becomes a primary factor of an error.

Likewise, when a vein pattern is rotated, a spatial domain in which the pattern is observed is changed, even though the vein pattern is originally the same. This becomes a primary factor of an error.

For the above reasons, the image correction unit 121 first corrects the amount of rotation of the vein image. The vein image is constituted by a plurality of pixels, and a position of each pixel can be represented using a coordinate. Therefore, in the vein image, a position of a pixel corresponding to a vein (a black pixel in FIG. 3A and the like) can be identified by a coordinate. Accordingly, the image correction unit 121 uses coordinates of pixels corresponding to veins in the vein image to perform principal component analysis. As a result of this principal component analysis, the image correction unit 121 can identify the direction of the first principal component as shown in the figure on the left side of FIG. 4. The image correction unit 121 calculates an angle between the direction of the first principal component and a longitudinal axial direction of the image frame (the longitudinal direction of the finger), and uses the calculated angle to rotate the vein image. Therefore, as shown in the figure on the right side of FIG. 4, rotational correction can be performed such that the direction of the first principal component becomes parallel with the longitudinal axial direction of the image frame (the longitudinal direction of the finger).

It should be noted that the method for calculating the angle through which the vein image is rotated is not limited to the above-explained method using the principal component analysis. Any other method for correcting the amount of rotation may be used.

Figure 5:
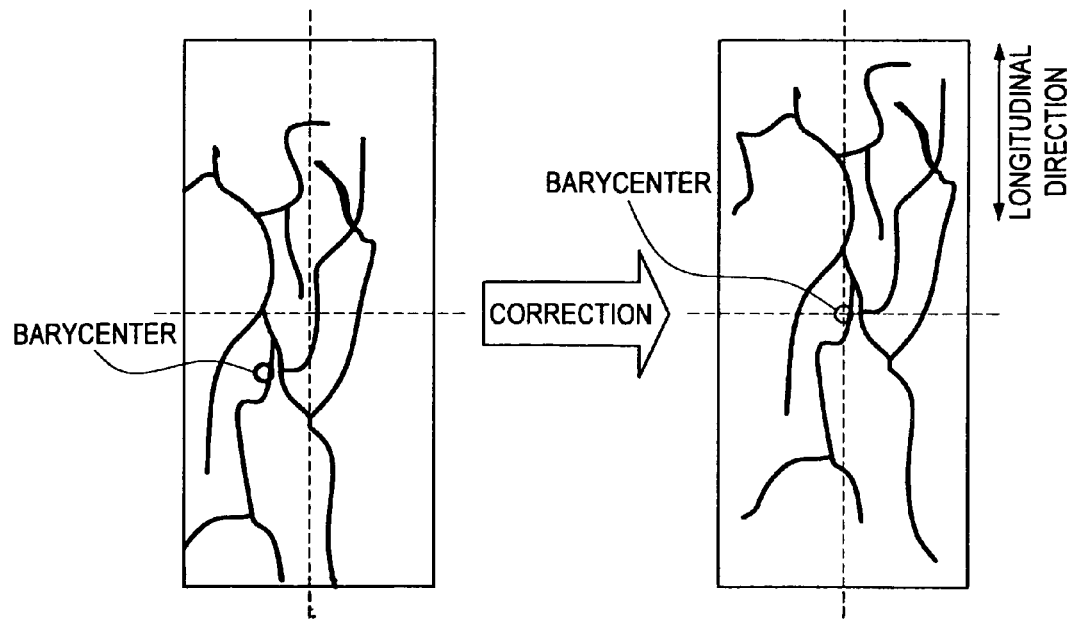
FIG. 5 is an explanatory diagram for illustrating the vein distribution vector calculation unit according to the embodiment.

Subsequently, the image correction unit 121 calculates a barycenter of the vein pattern by using the vein image in which the amount of rotation has been corrected. The barycenter can be calculated by using coordinates of pixels corresponding to veins. The image correction unit 121 calculates a difference between the coordinate corresponding to the calculated barycenter and the coordinate corresponding to the central position of the image frame, and moves the vein image in parallel such that the calculated barycenter comes to the central position of the image frame as shown in FIG. 5, for example. It should be noted that the central position of the image frame can be calculated based on the size of the image frame.

The image correction unit 121 performs such correction processing to generate a corrected vein image in which the direction of the first principal component of the vein pattern is in parallel with the longitudinal axial direction of the image frame and in which the barycenter of the vein pattern is located at the center of the image frame.

In a case where at least one of the correction processing of the amount of rotation and the correction processing of the position of the barycenter is unnecessary, the image correction unit 121 does not need to perform an unnecessary correction processing.

The image correction unit 121 transmits the obtained vein image thus corrected to the vein image dividing unit 123 and the vein pixel counting unit 125, which are explained later. Further, the image correction unit 121 may store the obtained vein image thus corrected to the storage unit 115 and the like.

The amount of rotation and the amount of parallel movement calculated by the image correction unit 121 can be used not only in the calculation processing of the vein distribution vector but also in the main authentication using the vein image itself and the templates. Further, the image correction unit 121 may notify the amount of rotation and the amount of parallel movement, which are thus calculated, to the biometric authentication unit 109. By notifying the amount of correction to the biometric authentication unit 109, the biometric authentication unit 109 can perform preprocessing prior to the main authentication in a shorter time.

The vein image dividing unit 123 divides the corrected vein image, which has been transmitted from the image correction unit 121, to a plurality of partial regions (hereinafter referred to as blocks) based on the number of divisions set in advance.

For example, a case will be hereinafter considered where a vein image is set to be divided into totally mn pieces of blocks having m blocks in the vertical direction (the longitudinal direction of the finger) and n blocks in the horizontal direction (the lateral direction of the finger). In this case, the vein image dividing unit 123 uses coordinates of pixels in the vein image to equally divide the vein image into m blocks in the vertical direction and n blocks in the horizontal direction, and determines coordinates of borders of respective blocks.

Instead of setting the number of divisions, a size of a block (p pixels in the vertical direction by q pixels in the horizontal direction) may be set. In this case, the vein image dividing unit 123 cuts a block having the predetermined size from a predetermined position of the vein image (for example, the upper left corner), based on the size of the block previously set. Even in such case, the vein image dividing unit determines coordinates of borders of respective blocks.

In this case, division parameters such as the number of divisions mn and the size of one block (p by q pixels) can be determined in advance according to any method. For example, an experiment and analysis may be carried out in advance, and the number of divisions, the size of the block, and the like may be determined using statistical processing and the like so that the authentication can be efficiently performed from the perspective of False Rejection Rate (FRR), False Acceptance Rate (FAR), and the like.

This dividing processing of the vein image may be processing for actually dividing the vein image into a plurality of images, or may be processing for determining borders at which the vein image is virtually divided into a plurality of regions.

It should be noted that the vein image dividing unit 123 may not divide the vein image in the vertical and horizontal directions. In other words, the vein image dividing unit 123 may divide the vein image only in the vertical direction or only in the horizontal direction, based on, for example, a feature of image pickup (tendency of image pickup) of the biometrics image pickup unit 101.

Figure 6:
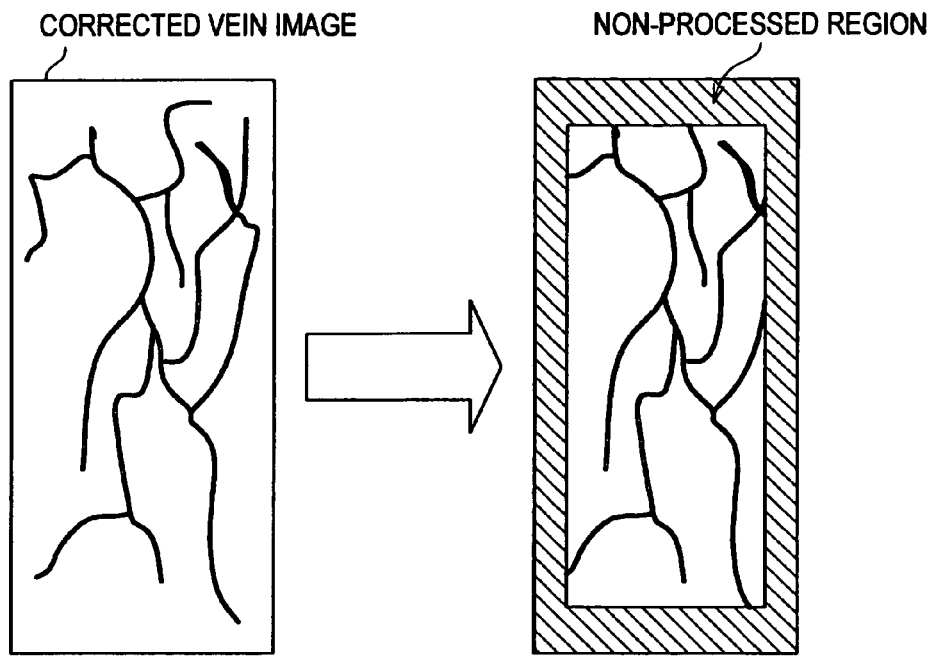
FIG. 6 is an explanatory diagram for illustrating the vein distribution vector calculation unit according to the embodiment.

As described above, a region in proximity to an end portion of the vein image is likely to be affected by parallel movement, rotation, and the like. Accordingly, for example, as shown in FIG. 6, the vein image dividing unit 123 does not perform the dividing processing on the end portion of the image frame indicated by a diagonal shade, and may perform the dividing processing on a region including the central position of the vein image. Therefore, the authentication can be performed in such a manner that the authentication is less affected by parallel movement, rotation, and the like. It should be noted that the size of the region that is not subjected to the dividing processing may be determined as desired according to a property of the biometric authentication apparatus 10. In FIG. 6, the non-processed region is a range having a predetermined number of pixels from each side of the image frame. Alternatively, the non-processed region may be determined as desired. For example, a range having a predetermined number of pixels from the upper and lower sides may be excluded from the processing, or a portion in which a displacement is likely to occur may be excluded from the processing.

It should be noted that the vein image dividing unit 123 divides the vein image such that the number of divisions during generation of the registered vein distribution vector is the same as the number of divisions during generation of the vein distribution vector in the authentication. This is because, if the number of divisions during generation of the registered vein distribution vector is different from the number of divisions in the authentication, a vector length (the number of elements) of the generated vein distribution vector becomes different as explained later, which may result in a failure to accurately perform the authentication.

The vein image dividing unit 123 transmits information representing the result of division thus obtained to the vein pixel counting unit 125 and the vector generation unit 127.

The vein pixel counting unit 125 is realized with, for example, a CPU, a ROM, a RAM, and the like. The vein pixel counting unit 125 counts the number of pixels corresponding to veins in each of the partial regions divided by the vein image dividing unit 123.

When the vein pixel counting unit 125 counts the number of pixels corresponding to veins, the vein pixel counting unit 125 may count the number of pixels corresponding to veins in each block according to a predetermined order, or may count the number of pixels in a plurality of blocks at a time.

The vein pixel counting unit 125 transmits the obtained count result to the vector generation unit 127. At this occasion, the vein pixel counting unit 125 preferably transmits the count result as well as information for identifying a block related to the count result.

The vector generation unit 127 is realized with, for example, a CPU, a ROM, a RAM, and the like. The vector generation unit 127 generates a vein distribution vector, i.e., a numerical sequence representing the degree of distribution of veins in a vein image by arranging, in a predetermined order, the count results of the partial regions provided by the vein pixel counting unit 125.

Figure 7:
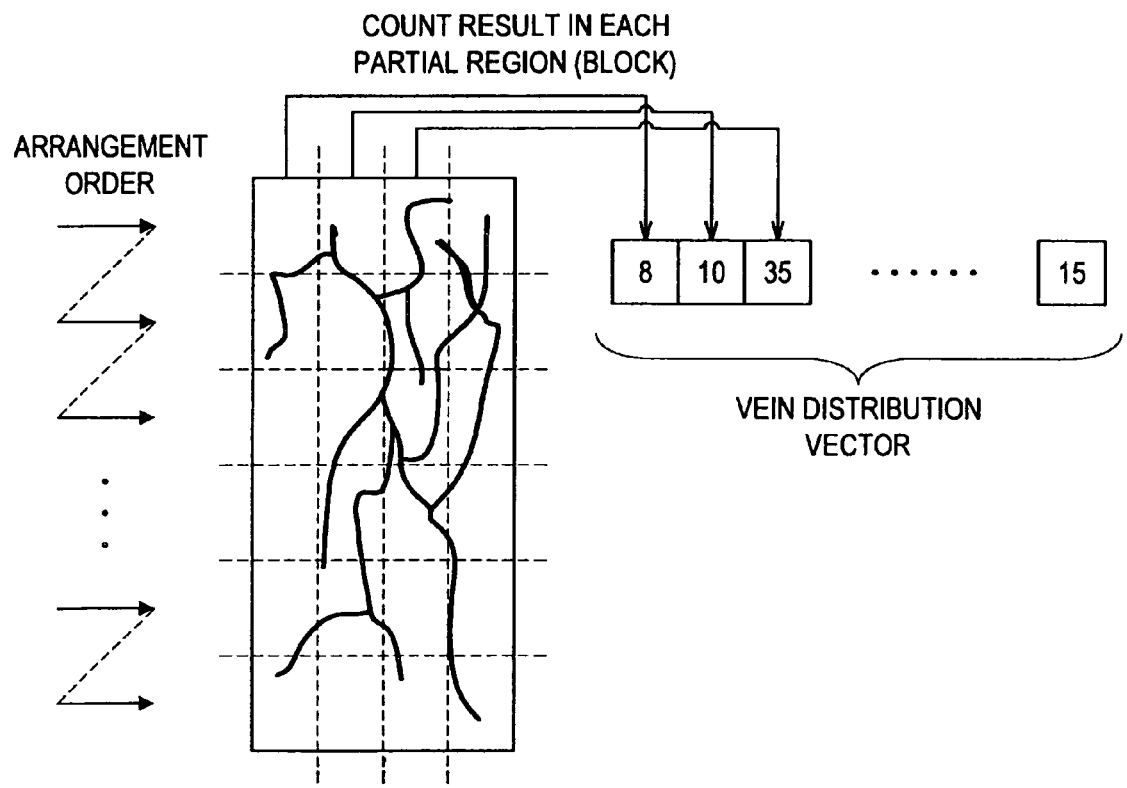
FIG. 7 is an explanatory diagram for illustrating the vein distribution vector calculation unit according to the embodiment.

For example, as shown in FIG. 7, in a case where a setting is made to arrange the count results from a block located at the upper left of the vein image to a block located at the lower right thereof, the vector generation unit 127 arranges the count results of corresponding blocks in order. Therefore, the vector generation unit 127 generates a numerical sequence having as many elements as the number of blocks existing. In this numerical sequence, the number of pixels corresponding to veins in a block are arranged in the predetermined order. Therefore, the numerical sequence can be used as a representation of a distribution situation of veins in the vein image.

Figure 8:
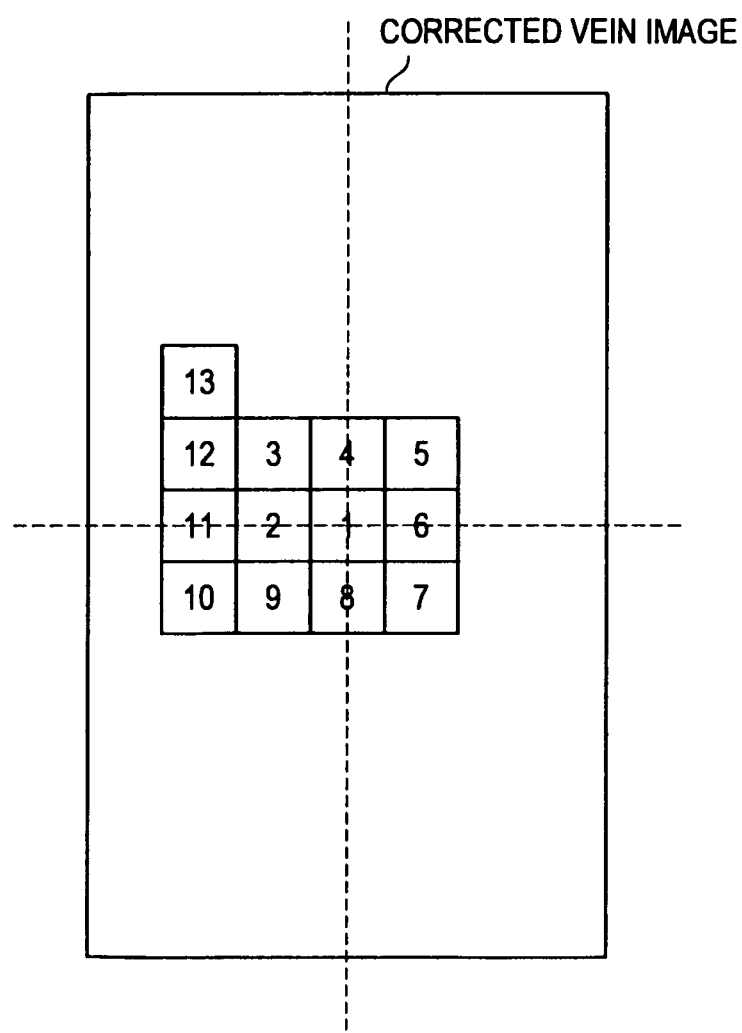
FIG. 8 is an explanatory diagram for illustrating the vein distribution vector calculation unit according to the embodiment.

The order of arrangement of the count results may be determined in any way. As shown in FIG. 7, the order may be in a horizontal direction from a block at the upper left to a block at the lower right, or may be in a vertical direction from a block at the upper left to a block at the lower right. Alternatively, as shown in FIG. 8, the order of arrangement of the count results may be, for example, in a spiral form from a block including the central position of the vein image. In a case where the order of arrangement as shown in FIG. 8 is adopted, the authentication starts from the block corresponding to the central position of the vein image during the authentication of the vein distribution vector. Therefore, there is a possibility that the time necessary for the authentication can be further reduced.

When the vector generation unit 127 finishes the generation of the vein distribution vector, the vector generation unit 127 transmits the generated vector to the biometric authentication unit 109.

The configuration of the vein distribution vector calculation unit 107 according to the present embodiment has been hereinabove explained in detail. Subsequently, the authentication processing of the vein distribution vector performed by the authentication unit 113 will be hereinafter explained in detail.

[Regarding Authentication Processing of Vein Distribution Vector Performed By Authentication Unit]

Subsequently, the authentication processing of the vein distribution vector carried out by the authentication unit 113 according to the present embodiment will be explained in detail with reference to FIGS. 9A to 12. FIGS. 9A to 12 are explanatory diagrams illustrating the authentication processing of the vein distribution vector carried out by the authentication unit according to the present embodiment.

The authentication processing of the vein distribution vector carried out by the authentication unit 113 can be performed in the same manner as a matching between one-dimensional vectors in general. In this case, the parallel movement in the vein image is adjusted by correction. Accordingly, when the registered user himself/herself is authenticated, the degree of similarity can be determined by just calculating a difference between vectors. However, when there are only a few patterns in the vein image, there is a possibility that a calculated barycenter includes an error. Therefore, the authentication unit 113 according to the present embodiment calculates a difference between the generated vein distribution vector and the registered vein distribution vector while one of the generated vein distribution vector and the registered vein distribution vector is fixed but the other of the generated vein distribution vector and the registered vein distribution vector is shifted by a predetermined quantity. Thus, the authentication unit 113 can identify the degree of similarity suitably used for the authentication processing.

Hereinafter, a method for calculating the degree of similarity between vectors using shift processing will be explained.

The registered vein distribution vector is denoted as Sr. The generated vein distribution vector is denoted as Si. The vector size (the number of elements included in the vector) is denoted as lv. Further, it is assumed that there may exist a shift of up to lSmax between the vectors. In this case, the authentication unit 113 calculates a score s represented by the following numerical formula 101 during authentication of the generated vein distribution vector. In this case, in the following numerical formula 101, S(r,p) represents a p-th element of the registered vein distribution vector Sr, and S(i,p) is a p-th element of the generated vein distribution vector Si.

[Expression 1]

$$\ldots \text{(Numerical formula 101)}$$

The above numerical formula 101 shows a method for calculating a score s in a case where the registered vein distribution vector is fixed but the generated vein distribution vector is shifted. In a case where the generated vein distribution vector is fixed but the registered vein distribution vector is shifted, r may be read as i, and i may be read as r in the above numerical formula 101.

What is meant by the above numerical formula 101 is as follows. The authentication unit 113 shifts the vein distribution vector Si by one element while fixing the registered vein distribution vector Sr. On every shift, the authentication unit 113 calculates a Sum of Absolute Difference between the two vectors, and adopts the smallest one as a score s.

As is evident from the numerical formula 101, the closer the registered vein distribution vector becomes to the generated vein distribution vector, the closer this score s becomes to zero. Therefore, when the calculated score s is equal to or less than a predetermined threshold value, the authentication unit 113 determines that the registered vein distribution vector is similar to the generated vein distribution vector, namely, determines that the authentication of the vein distribution vector is successful.

Figure 9A:
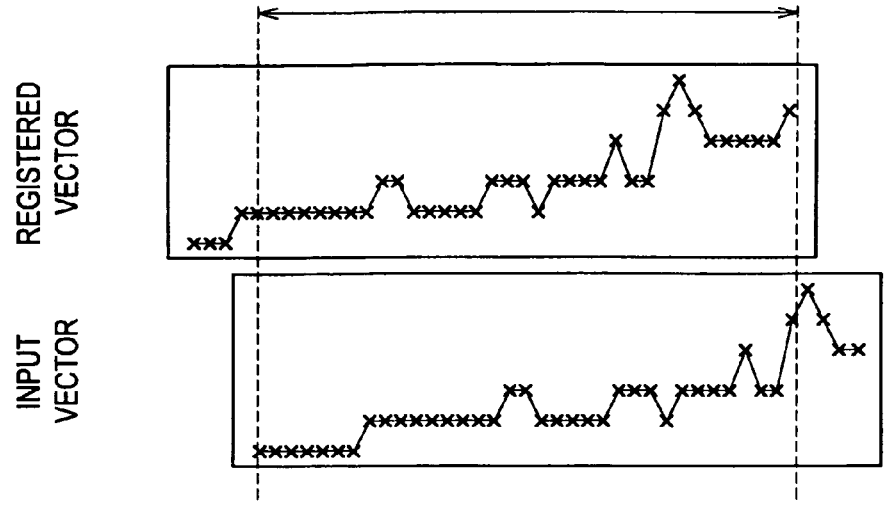
FIG. 9A is an explanatory diagram for illustrating an authentication processing of a vein distribution vector carried out by the authentication unit according to the embodiment.
Figure 9B:
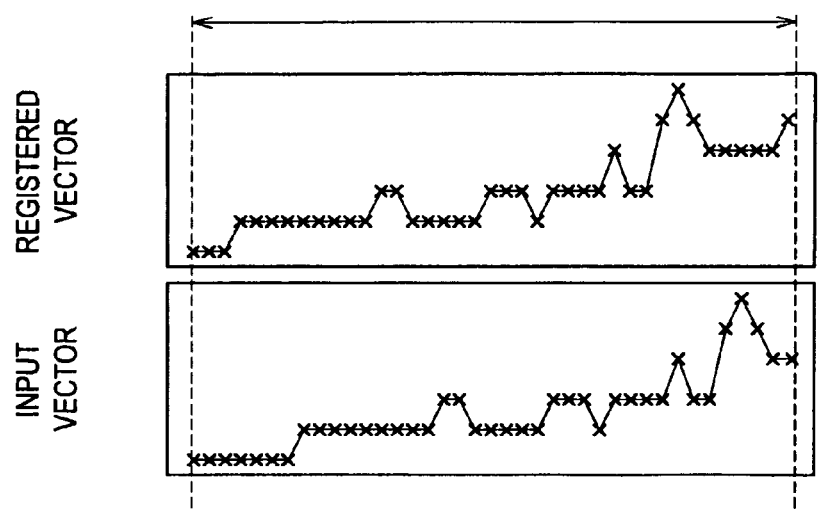
FIG. 9B is an explanatory diagram for illustrating an authentication processing of a vein distribution vector carried out by the authentication unit according to the embodiment.
Figure 9C:
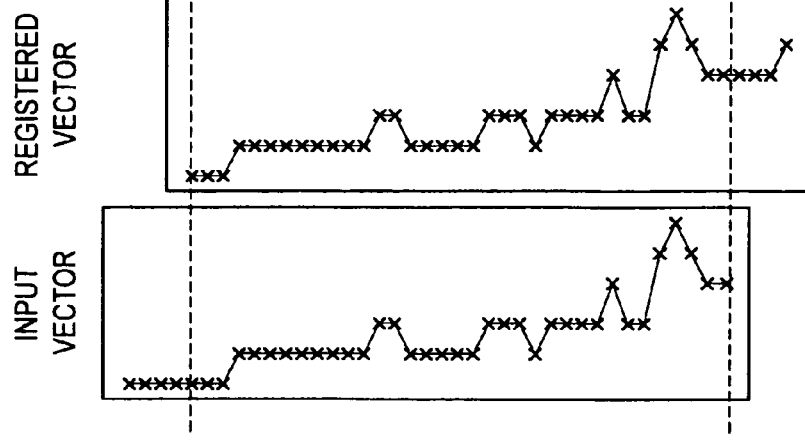
FIG. 9C is an explanatory diagram for illustrating an authentication processing of a vein distribution vector carried out by the authentication unit according to the embodiment.

For example, in the examples shown in FIGS. 9A to 9C, a shift amount of FIG. 9A is −4, a shift amount of FIG. 9B is 0, and a shift amount of FIG. 9C is +4. However, as is evident from these figures, the calculated score s is the smallest in the case of FIG. 9A. Therefore, the authentication unit 113 determines that the two vectors in the state of FIG. 9A are the most similar state among the three states shown in FIGS. 9A to 9C.

As described above, the authentication unit 113 calculates the degree of similarity between the registered vein distribution vector and the generated vein distribution vector while one of the registered vein distribution vector and the generated vein distribution vector is fixed but the other of the registered vein distribution vector and the generated vein distribution vector is shifted. Therefore, even when there is some portion in the vein image which the image correction unit 121 is unable to sufficiently correct due to the affect of parallel movement, rotation, and the like, the image correction unit 121 can suppress an error in the portion that is not to be sufficiently corrected, and can ensure the accuracy of the authentication.

Further, this authentication processing of the vein distribution vector is a so-called metadata authentication processing, and is performed to narrow down the number of templates subjected to collation before the main authentication processing using the templates. The vein distribution vector representing the distribution situation of veins in each portion of the finger is one-dimensional vector including numerals. Therefore, the two vein distribution vector can be easily compared by a verification method, called a comparison of one-dimensional vectors, that can be easily performed. Further, since the vein distribution vector itself is an index according to which users can be accurately classified, the number of templates subjected to collation can be efficiently narrowed down by using the vein distribution vector.

Figure 10:
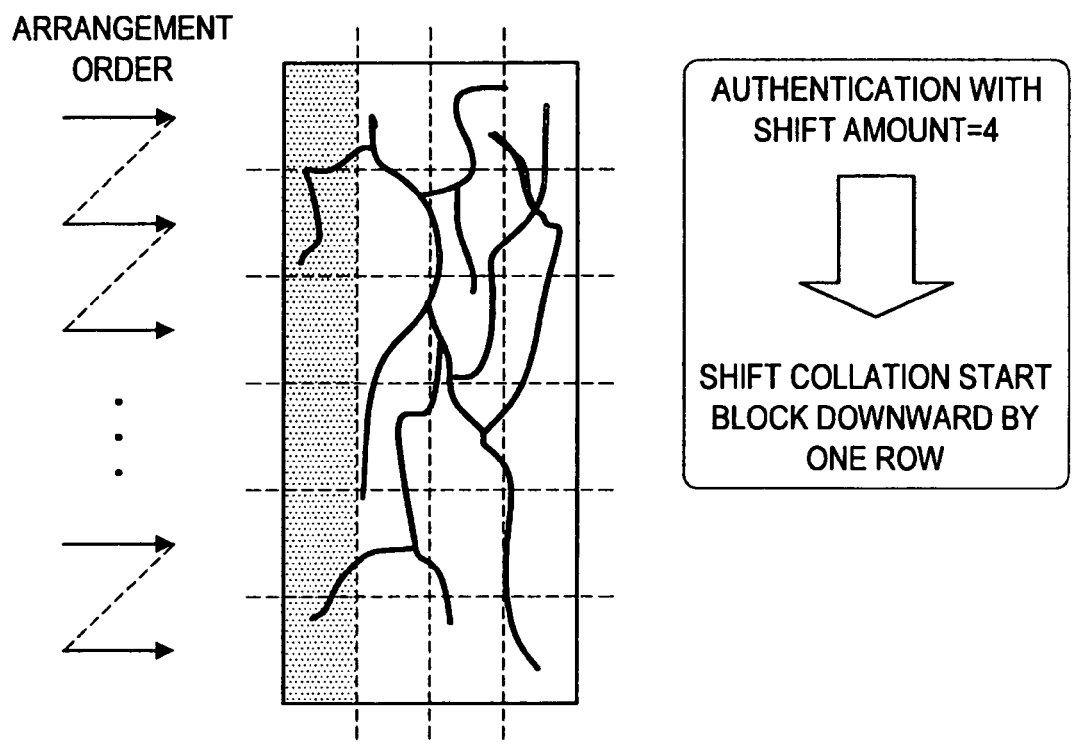
FIG. 10 is an explanatory diagram for illustrating an authentication processing of a vein distribution vector carried out by the authentication unit according to the embodiment.

In the above numerical formula 101, the shift amount is one element. However, the shift amount is not limited to such value. For example, as shown in FIG. 10, a case will be considered where the vein distribution vector includes count results arranged in the horizontal direction from a block at the upper left corner to a block at the lower right corner. In this case, when the shift amount is four, the authentication unit 113 first collates the count result corresponding to the block at the upper left corner, and subsequently, collates a count result corresponding to a block first from the left and second from the top. As shown in FIG. 10, this means that a collation start position is shifted downward by one row at a time. The authentication unit 113 selects the shift amount as described above and thus performs the authentication while attention is given to a displacement in the vertical direction in an environment in which a displacement in the vertical direction is likely to occur due to an installation situation and the like of the biometrics image pickup unit 101.

Figure 11:
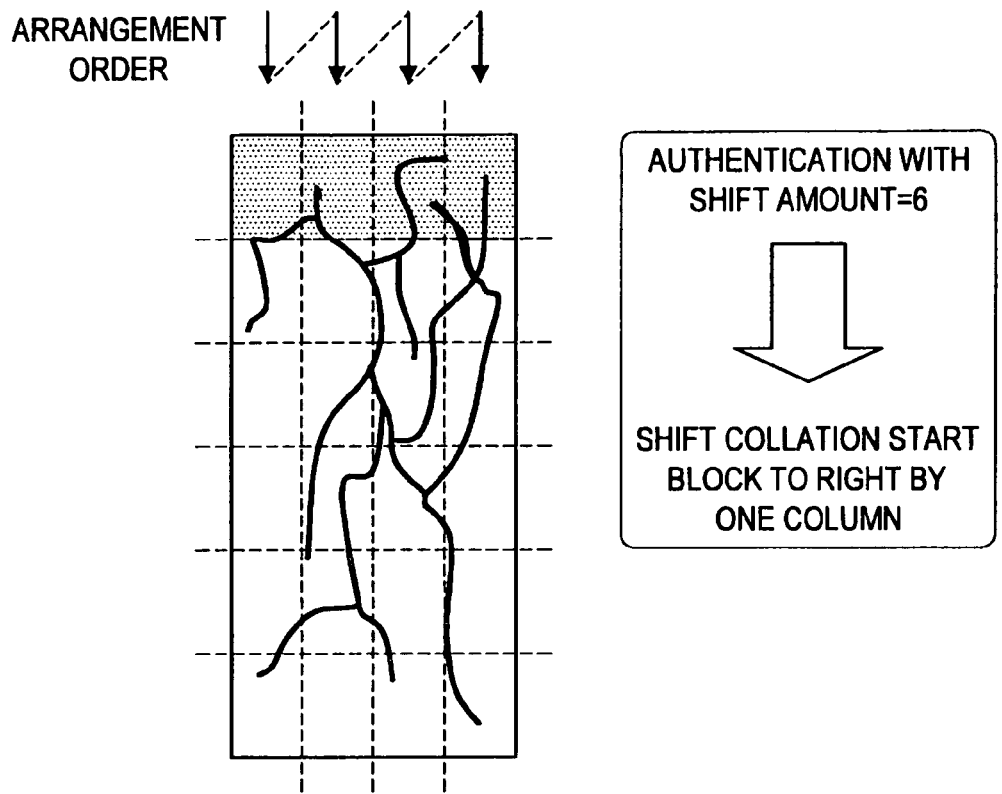
FIG. 11 is an explanatory diagram for illustrating an authentication processing of a vein distribution vector carried out by the authentication unit according to the embodiment.

Likewise, the example shown in FIG. 11 illustrates a case where the vein distribution vector includes count results arranged in the vertical direction from a block at the upper left corner to a block at the lower right corner. In this case, when the shift amount is six, the authentication unit 113 first collates the count result corresponding to the block at the upper left corner, and subsequently, collates a count result corresponding to a block second from the left and first from the top. As shown in FIG. 11, this means that a collation start position is shifted to right by one column at a time. The authentication unit 113 selects the shift amount as described above and thus performs the authentication while attention is given to a displacement in the horizontal direction in an environment in which a displacement in the horizontal direction is likely to occur due to an installation situation and the like of the biometrics image pickup unit 101.

Figure 12:
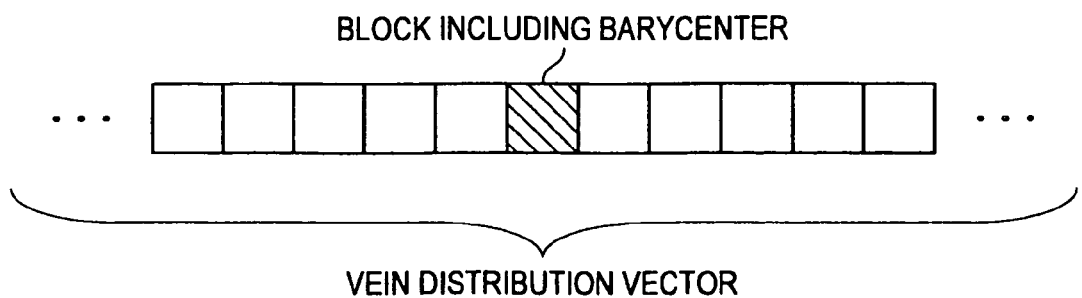
FIG. 12 is an explanatory diagram for illustrating an authentication processing of a vein distribution vector carried out by the authentication unit according to the embodiment.

In the example shown in FIGS. 9A to 11, the authentication unit 113 starts the collation from the first element of the vein distribution vector. However, the collation is not limited thereto. For example, as shown in FIG. 12, the authentication unit 113 may identify an element describing a count result of a block including the center of the vein image (i.e., a barycenter of a vein pattern), and may start the collation from the block including the barycenter. When the collation starts from the block as described above, there is a possibility that the time necessary for the authentication can be further reduced.

Before the above-described authentication processing of the vein distribution vector, the authentication unit 113 may calculate summations of the elements of the generated vein distribution vector and the registered vein distribution vector, and may compare the summations of the elements with each other. The summation of the elements included in the vein distribution vector means the total number of pixels corresponding to veins in the entire finger. Therefore, the authentication unit 113 compares the summations as described above and thus can omit the comparison between the vectors having different amounts of veins in the entire finger.

Further, the authentication unit 113 may use a difference between the generated vein distribution vector and the registered vein distribution vector to further calculate a distribution of the difference. By analyzing the distribution, the authentication unit 113 can determine whether parallel movement or the like causes a difference between the two vein distribution vectors which are originally similar or whether the two vein distribution vectors are fundamentally, completely different vectors.

An example of a function of the biometric authentication apparatus 10 according to the present embodiment has been explained hereinabove. Each of the above constituent elements may be made with a generally-used member and circuit, or may be made with hardware dedicated for the function of each constituent element. Alternatively, all of the functions of the constituent elements may be performed by a CPU and the like. Therefore, the used configuration may be changed as necessary in accordance with the state of art at the time when the present embodiment is carried out.

It is possible to make a computer program for realizing the functions of the above-described biometric authentication apparatus according to the present embodiment, and the computer program can be implemented on a personal computer and the like. Further, a computer-readable recording medium storing such computer program can be provided. Examples of recording media include a magnetic disk, an optical disk, a magneto-optical disk, and a flash memory. Further, for example, the above computer program may be distributed by a network, without using any recording medium.

In the above-described case, the biometric authentication apparatus 10 according to the present embodiment includes the biometrics image pickup unit 101 and image pickup control unit 103. Alternatively, the biometric authentication apparatus 10 may not include the biometrics image pickup unit 101 and the image pickup control unit 103. Instead, the biometric authentication apparatus 10 may obtain biometrics image pickup data taken by a biometrics image pickup apparatus arranged outside, and may authenticate this biometrics image pickup data. Further, the vein distribution vector calculation unit 107 of the biometric authentication apparatus 10 preferably includes the image correction unit 121. However, the vein distribution vector calculation unit 107 may not include the image correction unit 121.

<Regarding Biometric Authentication Method>

Figure 13:
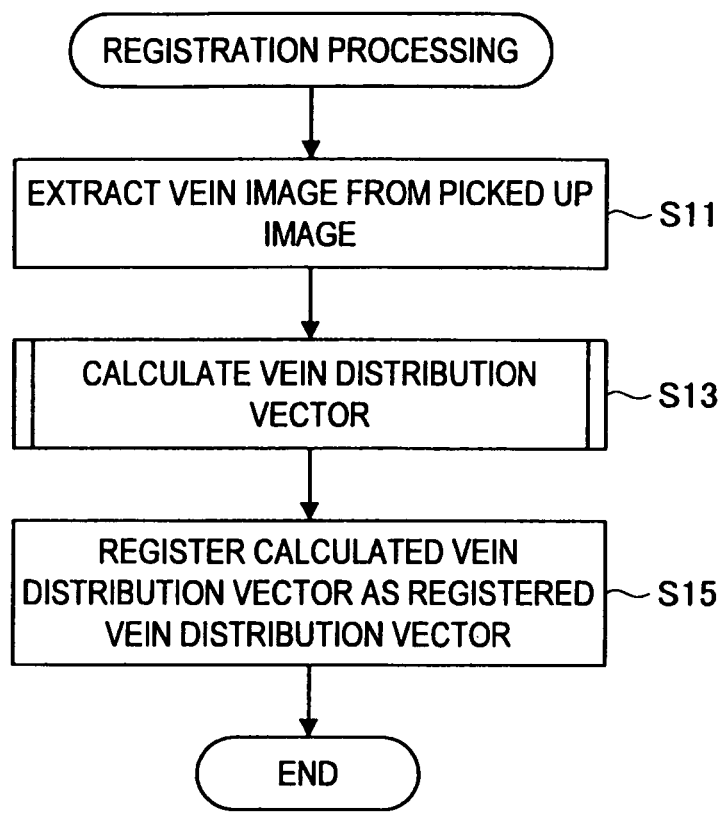
FIG. 13 is a flow diagram illustrating a flow of a registration processing of a vein distribution vector according to the embodiment.
Figure 14:
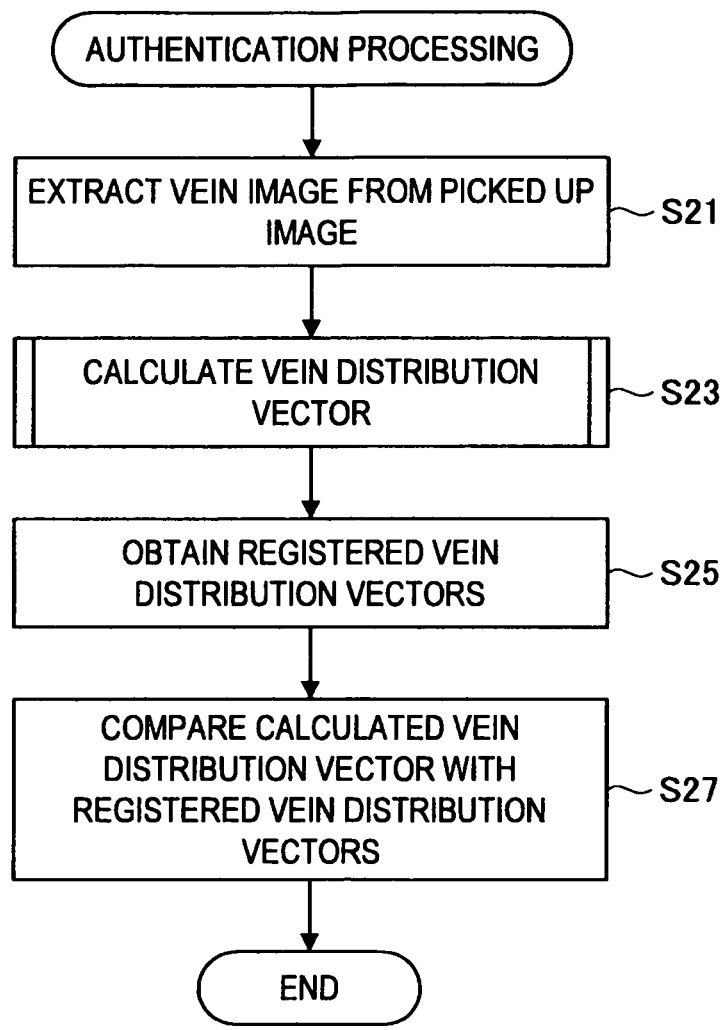
FIG. 14 is a flow diagram illustrating a flow of an authentication processing of the vein distribution vector according to the embodiment.
Figure 15:
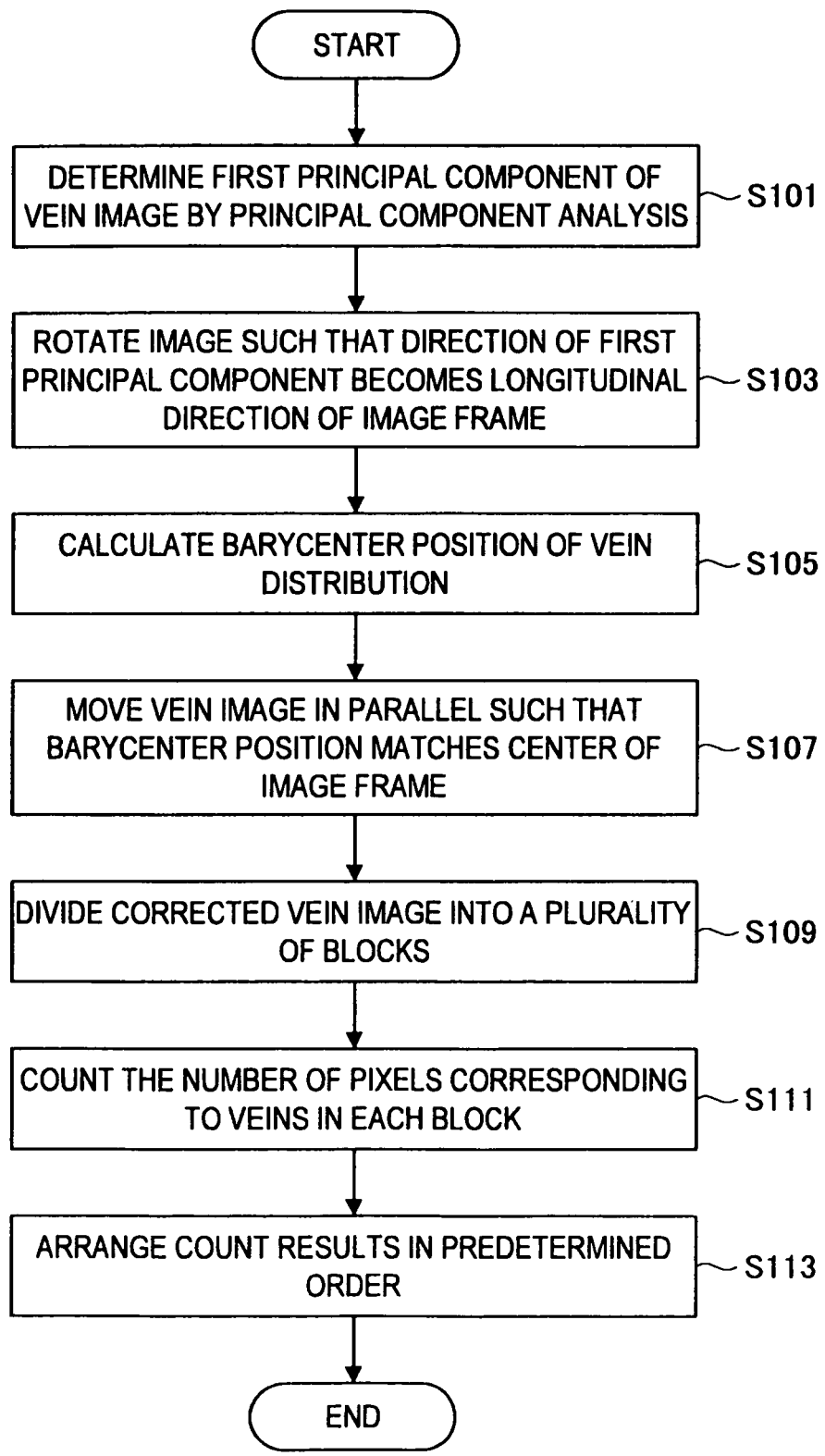
FIG. 15 is a flow diagram illustrating a flow of calculation processing of the vein distribution vector according to the embodiment.

Subsequently, a flow of a biometric authentication method carried out by the biometric authentication apparatus 10 according to the present embodiment will be explained with reference to FIGS. 13 to 15. FIG. 13 is a flow diagram illustrating the registration processing of the vein distribution vector carried out by the biometric authentication apparatus 10 according to the present embodiment. FIG. 14 is a flow diagram illustrating the authentication processing of the vein distribution vector carried out by the biometric authentication apparatus 10 according to the present embodiment. FIG. 15 is a flow diagram illustrating the calculation processing of the vein distribution vector carried out by the biometric authentication apparatus 10 according to the present embodiment.

[Regarding Registration Processing of Vein Distribution Vector]

First the flow of the registration processing of the vein distribution vector will be briefly explained with reference to FIG. 13.

Before the following explanation, the biometric authentication apparatus 10 is assumed to have obtained image pickup data, generated by picking up an image of a finger, from the biometrics image pickup unit 101 arranged in the biometric authentication apparatus 10 or a biometrics image pickup apparatus arranged outside.

The vein image extraction unit 105 of the biometric authentication apparatus 10 extracts a vein image representing a vein pattern from a picked up image corresponding to the obtained image pickup data (step S11). The vein image extraction unit 105 outputs the extracted vein image to the vein distribution vector calculation unit 107 and the registration unit 111 of the biometric authentication unit 109.

The vein distribution vector calculation unit 107 uses the obtained vein image to calculate a vein distribution vector, i.e., a numerical sequence representing the degree of distribution of veins in the vein image (step S13). When the vein distribution vector calculation unit 107 finishes the calculation of the vein distribution vector, the vein distribution vector calculation unit 107 outputs the calculated vein distribution vector to the registration unit 111 of the biometric authentication unit 109.

The registration unit 111 of the biometric authentication unit 109 registers the vein distribution vector calculated by the vein distribution vector calculation unit 107 as a registered vein distribution vector to the storage unit 115 and the like (step S15). At this occasion, the registration unit 111 associates the vein distribution vector to be registered and the vein image to be registered as a template. When the registration unit 111 registers the vein distribution vector, the registration unit 111 may compress the vein distribution vector by a predetermined method.

The biometric authentication apparatus 10 according to the present embodiment can register the vein distribution vector as the registered vein distribution vector by performing the flow of processings as described above.

[Regarding Authentication Processing of Vein Distribution Vector]

Subsequently, a flow of the authentication processing of the vein distribution vector will be briefly explained with reference to FIG. 14.

Before the following explanation, the biometric authentication apparatus 10 is assumed to have obtained image pickup data, generated by picking up an image of a finger, from the biometrics image pickup unit 101 arranged in the biometric authentication apparatus 10 or a biometrics image pickup apparatus arranged outside.

The vein image extraction unit 105 of the biometric authentication apparatus 10 extracts a vein image representing a vein pattern from a picked up image corresponding to the obtained image pickup data (step S21). The vein image extraction unit 105 outputs the extracted vein image to the vein distribution vector calculation unit 107 and the authentication unit 113 of the biometric authentication unit 109.

The vein distribution vector calculation unit 107 uses the obtained vein image to calculate a vein distribution vector, i.e., a numerical sequence representing the degree of distribution of veins in the vein image (step S23). When the vein distribution vector calculation unit 107 finishes the calculation of the vein distribution vector, the vein distribution vector calculation unit 107 outputs the calculated vein distribution vector to the authentication unit 113 of the biometric authentication unit 109.

First, the authentication unit 113 of the biometric authentication unit 109 obtains the registered vein distribution vector stored in the storage unit 115 and the like (step S25). Subsequently, the authentication unit 113 compares each of the obtained, registered vein distribution vectors with the calculated vein distribution vector (step S27). This comparison is performed using a score s calculated based on the above-explained numerical formula 101 and the like. When the score s is determined to be equal to or less than a predetermined threshold value, the registered vein distribution vector is determined to be similar to the calculated vein distribution vector.

When the comparison of the vein distribution vector is finished, the authentication unit 113 obtains templates associated with registered vein distribution vectors which are determined to be similar to the calculated vein distribution vector. Thereafter, the authentication unit 113 starts authentication of a vein image notified by the vein image extraction unit 105 based on the obtained templates (in other words, main authentication processing). Before the main authentication processing, metadata authentication and authentication processing using thumbnail images may be further performed.

The biometric authentication apparatus 10 according to the present embodiment can authenticate the vein distribution vector and narrow down the templates used in the main authentication processing by performing the flow of processings as described above.

[Regarding Calculation Processing of Vein Distribution Vector]

Subsequently, a flow of the calculation processing of the vein distribution vector carried out by the vein distribution vector calculation unit 107 will be explained with reference to FIG. 15.

When a vein image is input from the vein image extraction unit 105, the image correction unit 121 of the vein distribution vector calculation unit 107 first carries out principal component analysis on the vein image. Thereby, the image correction unit 121 determines the first principal component of the vein image (step S101).

Subsequently, the image correction unit 121 rotates the image such that the direction of the determined first principal component becomes in parallel with the vertical direction of the image frame (step S103). Therefore, the image correction unit 121 can correct the rotation of the vein image.

Subsequently, the image correction unit 121 calculates a position of a barycenter of a vein distribution (distribution of pixels corresponding to veins) in the vein image whose rotation has been corrected (step S105).

Subsequently, the image correction unit 121 moves the rotation-corrected vein image in parallel such that the calculated position of the barycenter matches the center of the image frame (step S107). Thereby, the image correction unit 121 can move the vein pattern in parallel to the center of the image frame.

When the image correction unit 121 finishes these corrections, the image correction unit 121 outputs the corrected vein image to the vein image dividing unit 123 and the vein pixel counting unit 125.

Subsequently, the vein image dividing unit 123 divides the corrected vein image into a plurality of blocks (step S109). When the vein image dividing unit 123 finishes the dividing processing, the vein image dividing unit 123 outputs information representing the result of division to the vein pixel counting unit 125 and the vector generation unit 127.

Subsequently, the vein pixel counting unit 125 uses the corrected vein image and the information representing the result of division to count the number of pixels corresponding to veins in each block (step S111). When the vein pixel counting unit 125 finishes the counting, the vein pixel counting unit 125 outputs the information representing the count results to the vector generation unit 127.

When the vector generation unit 127 obtains the information representing the count results, the vector generation unit 127 arranges the count results in a predetermined order, and adopts the arranged count results as a vein distribution vector (step S113). The vector generation unit 127 outputs the generated vein distribution vector to the biometric authentication unit 109.

The vein distribution vector calculation unit 107 according to the present embodiment can calculate the vein distribution vector by performing the flow of processings as described above.

Example

Subsequently, a result of metadata authentication carried out using a vein distribution vector according to the present embodiment will be explained.

Totally 482 fingers are registered as samples to a finger vein database used for a verification. For each finger, there are three vein images. For each finger, three vein distribution vectors are registered (Namely, one vein distribution vector for each vein image).

When the registration is completed, each finger is input five times under a condition that "a finger is input every time a certain period of time passes", and five vein distribution vectors are generated for each finger.

Therefore, in this verification experiment, 482 fingers×5 times=2410 pieces of input data and 482 fingers×3 pieces=1446 pieces of registered vein distribution vectors are compared.

Comparison processing performed three times for each input corresponds to "user authentication". Therefore, totally, there are 2410×3=7230 times of user authentication results.

On the other hand, comparison processing performed for 1446−3=1443 times for each input corresponds to "other persons' authentication". Therefore, totally, there are other persons' authentication results performed for 2410×1443=3477630 times.

A threshold value is set such that an authentication is determined to be successful when the user authentication result is 99% or more, and what percentage of other persons' authentications are rejected based on the set threshold value is output as a result.

In this verification experiment, the size of the vein image is 120 by 60 pixels. This vein image is divided into partial regions each having 15 by 15 pixels, and the vein distribution vector is calculated.

This verification processing is performed on the following five types of algorithms.

1) Algorithm using vascular volume of entire finger as metadata (method in the related art)
2) Algorithm using vein distribution vector (without comparison by image correction and shift)
3) Algorithm using image correction and vein distribution vector (without comparison by shift)
4) Algorithm for carrying out comparison by vein distribution vector and shift (without image correction)
5) Algorithm for carrying out comparison by image correction, vein distribution vector, and shift True Reject Rates obtained from the above five types of algorithms are shown in the following Table 1.

TABLE 1

| Algorithm | True Reject Rate (%) |
|---|---|
| 1 | 49.81 |
| 2 | 69.56 |
| 3 | 78.17 |
| 4 | 78.22 |
| 5 | 80.99 |

In Table 1, the algorithm 1 corresponds to the method in the related art, and the algorithms 2 to 5 are methods using vein distribution vectors according to the present embodiment. As is evident from the result of Table 1, when the vein distribution vector is taken into consideration (algorithm 2), other persons' registered data can be rejected at a rate about 20% higher than that of the method in the related art.

As is evident from the comparison between the algorithm 2 and the algorithm 3 or 4, when the comparison by image correction or shift is further applied, other persons' registered data can be rejected at a rate about 10% higher than that of the algorithm 2.

As is evident from the result of the algorithm 5, when the comparison by image correction and shift is carried out, about 81% of other persons' registered data can be rejected.

As is evident from this result, the biometric authentication method according to the present embodiment provides an extremely high accuracy and is effective as metadata authentication.

Hardware Configuration

Figure 16:
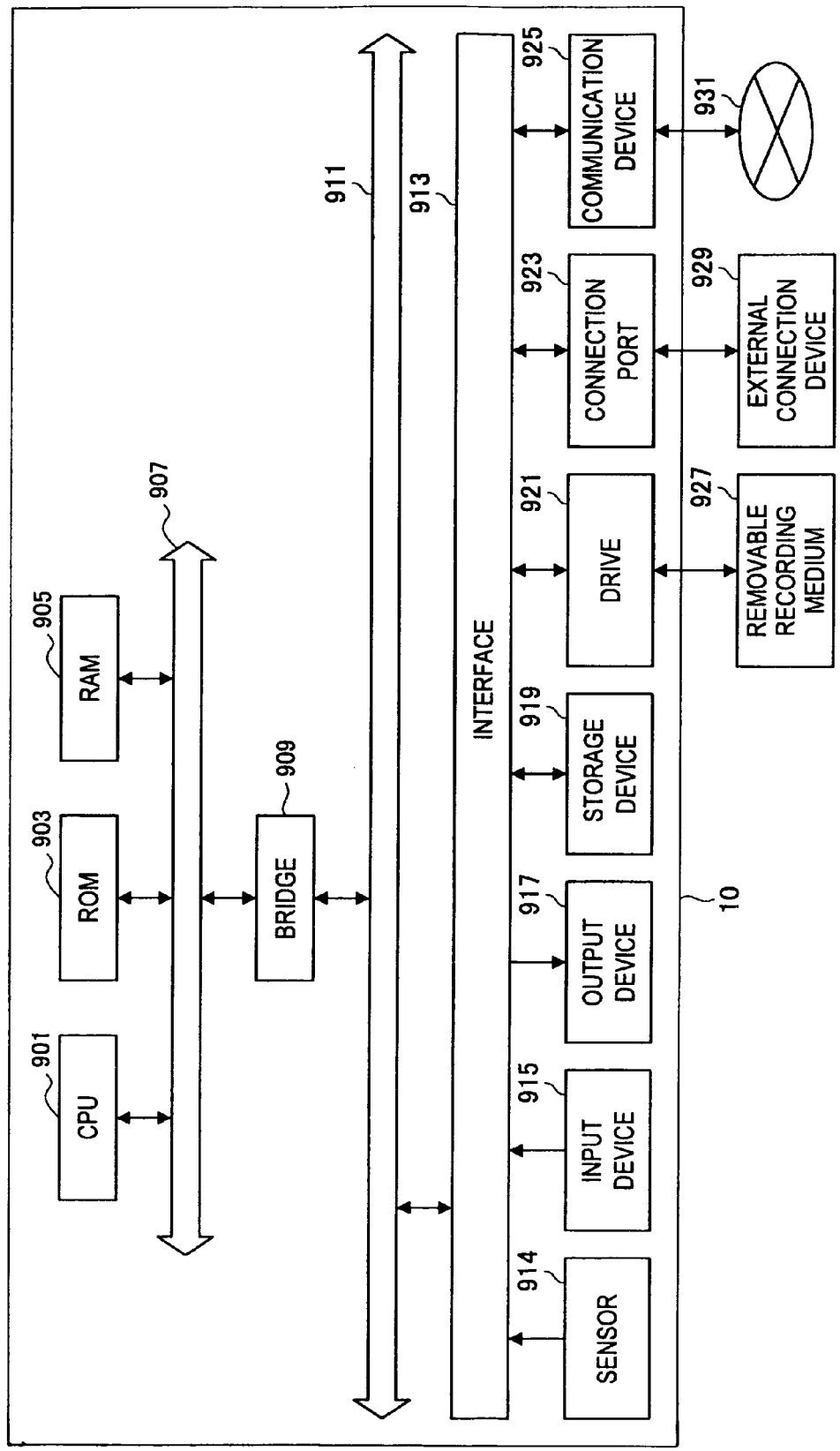
FIG. 16 is a block diagram illustrating a hardware configuration of a biometric authentication apparatus according to the embodiment of the present invention.

Next, the hardware configuration of the biometric authentication apparatus 10 according to the embodiment of the present invention will be described in detail with reference to FIG. 16. FIG. 16 is a block diagram for illustrating the hardware configuration of the biometric authentication apparatus 10 according to the embodiment of the present invention.

The biometric authentication apparatus 10 mainly includes a CPU 901, a ROM 903, and a RAM 905. Furthermore, the biometric authentication apparatus 10 also includes a host bus 907, a bridge 909, an external bus 911, an interface 913, an sensor 914, an input device 915, an output device 917, a storage device 919, a drive 921, a connection port 923, and a communication device 925.

The CPU 901 serves as an arithmetic processing apparatus and a control device, and controls the overall operation or a part of the operation of the biometric authentication apparatus 10 according to various programs recorded in the ROM 903, the RAM 905, the storage device 919, or a removable recording medium 927. The ROM 903 stores programs, operation parameters, and the like used by the CPU 901. The RAM 905 primarily stores programs used in execution of the CPU 901 and parameters and the like varying as appropriate during the execution. These are connected with each other via the host bus 907 configured from an internal bus such as a CPU bus or the like.

The host bus 907 is connected to the external bus 911 such as a PCI (Peripheral Component Interconnect/Interface) bus via the bridge 909.

The sensor 914 is a detection means for detecting, for example, biometric authentication unique to a user, or various pieces of information used for obtaining such biometric authentication. Examples of this sensor 914 are, for example, various kinds of an image pickup device, such as CCD (Charge Coupled Device), CMOS (Complementary Metal Oxide Semiconductor), or the like. Moreover, the sensor 914 may further include an optical system and a light source unit, or the like, for a lens used to pick up a living body portion. The sensor 914 may be a microphone, or the like, for obtaining audio data or the like. Note that the sensor 914 may include various kinds of measuring devices other than those described above, such as a thermometer, an illuminometer, a hygrometer, a speed meter, an accelerometer, or the like.

The input device 915 is an operation means operated by a user, such as a mouse, a keyboard, a touch panel, buttons, a switch and a lever. Also, the input device 915 may be a remote control means (a so-called remote control) using, for example, infrared light or other radio waves, or may be an externally connected device 929 such as a mobile phone or a PDA conforming to the operation of the biometric authentication apparatus 10. Furthermore, the input device 915 generates an input signal based on, for example, information which is input by a user with the above operation means, and is configured from an input control circuit for outputting the input signal to the CPU 901. The user of the biometric authentication apparatus 10 can input various data to the biometric authentication apparatus 10 and can instruct the biometric authentication apparatus 10 to perform processing by operating this input apparatus 915.

The output device 917 is configured from a device capable of visually or audibly notifying acquired information to a user. Examples of such device include display devices such as a CRT display device, a liquid crystal display device, a plasma display device, an EL display device and lamps, audio output devices such as a speaker and a headphone, a printer, a mobile phone, a facsimile machine, and the like. For example, the output device 917 outputs a result obtained by various processings performed by the biometric authentication apparatus 10. More specifically, the display device displays, in the form of texts or images, a result obtained by various processes performed by the biometric authentication apparatus 10. On the other hand, the audio output device converts an audio signal such as reproduced audio data and sound data into an analog signal, and outputs the analog signal.

The storage device 919 is a device for storing data configured as an example of a storage unit of the biometric authentication apparatus 10 and is used to store data. The storage device 919 is configured from, for example, a magnetic storage device such as a HDD (Hard Disk Drive), a semiconductor storage device, an optical storage device, or a magneto-optical storage device. This storage device 919 stores programs to be executed by the CPU 901, various data, and various data obtained from the outside.

The drive 921 is a reader/writer for recording medium, and is embedded in the biometric authentication apparatus 10 or attached externally thereto. The drive 921 reads information recorded in the attached removable recording medium 927 such as a magnetic disk, an optical disk, a magneto-optical disk, or a semiconductor memory, and outputs the read information to the RAM 905. Furthermore, the drive 921 can write in the attached removable recording medium 927 such as a magnetic disk, an optical disk, a magneto-optical disk, or a semiconductor memory. The removable recording medium 927 is, for example, a DVD medium, an HD-DVD medium, or a Blu-ray medium. The removable recording medium 927 may be a CompactFlash (CF; registered trademark), a flash memory, an SD memory card (Secure Digital Memory Card), or the like. Alternatively, the removable recording medium 927 may be, for example, an IC card (Integrated Circuit Card) equipped with a non-contact IC chip or an electronic appliance.

The connection port 923 is a port for allowing devices to directly connect to the biometric authentication apparatus 10. Examples of the connection port 923 include a USB (Universal Serial Bus) port, an IEEE1394 port, a SCSI (Small Computer System Interface) port, and the like. Other examples of the connection port 923 include an RS-232C port, an optical audio terminal, an HDMI (High-Definition Multimedia Interface) port, and the like. By the externally connected apparatus 929 connecting to this connection port 923, the biometric authentication apparatus 10 directly obtains various data from the externally connected apparatus 929 and provides various data to the externally connected apparatus 929.

The communication device 925 is a communication interface configured from, for example, a communication device for connecting to a communication network 931. The communication device 925 is, for example, a wired or wireless LAN (Local Area Network), Bluetooth (registered trademark), a communication card for WUSB (Wireless USB), or the like. Alternatively, the communication device 925 may be a router for optical communication, a router for ADSL (Asymmetric Digital Subscriber Line), a modem for various communications, or the like. This communication device 925 can transmit and receive signals and the like in accordance with a predetermined protocol such as TCP/IP on the Internet and with other communication devices, for example. The communication network 931 connected to the communication device 925 is configured from a network and the like, which is connected via wire or wirelessly, and may be, for example), the Internet, a home LAN, infrared communication, radio wave communication, satellite communication.

Heretofore, an example of the hardware configuration capable of realizing the functions of the biometric authentication apparatus 10 according to the embodiment of the present invention has been shown. Each of the structural elements described above may be configured using a general-purpose material, or may be configured from hardware dedicated to the function of each structural element. Accordingly, the hardware configuration to be used can be changed as appropriate according to the technical level at the time of carrying out the present embodiment.

Summary

As described above, in the biometric authentication apparatus and the biometric authentication method according to the embodiment of the present invention, a vein distribution vector, i.e., a numerical sequence representing the degree of distribution of veins in a vein image, is generated, and this vein distribution vector is used as metadata authentication. Therefore, the number of templates subjected to collation during main authentication processing can be sufficiently narrowed down. As a result, when the biometric authentication method according to the present embodiment is applied, it is possible to reduce a load during the main authentication processing in which it takes a lot of resources and a long time to perform processing called a pattern matching between a vein image and templates.

It should be understood by those skilled in the art that various modifications, combinations, sub-combinations and alterations may occur depending on design requirements and other factors insofar as they are within the scope of the appended claims or the equivalents thereof.

What is claimed is:

1. A biometric authentication apparatus comprising:
one or more processors configured to:
control a light source that emit a light having a predetermined wavelength to a finger portion;
extract a vein image showing positions of veins from an image including veins in the finger portion;
divide the extracted vein image into a plurality of partial regions;
count a number of pixels corresponding to the veins in each of the partial regions;
arrange, in a predetermined order, count results of the respective partial regions;
generate a vein distribution vector, which is a numerical sequence representing a degree of distribution of the veins in the vein image;
authenticate the generated vein distribution vector based on a registered vein distribution vector, which is a vein distribution vector registered in advance;
calculate a degree of similarity between the generated vein distribution vector and the registered vein distribution vector, while one of the generated vein distribution vector and the registered vein distribution vector is repeatedly shifted by a predetermined number of elements;
correct the vein image by performing at least one of a parallel moving processing and a rotation processing on the extracted vein image;
perform a principal component analysis on a not-yet-corrected vein image, and rotate the not-yet-corrected vein image such that a direction of a first principal component is in parallel with a side in a longitudinal direction of the vein image; and
calculate a barycenter of a distribution of pixels corresponding to the positions of the veins in the not-yet-corrected vein image, and move the not-yet-corrected vein image in parallel such that the barycenter matches a central position of the vein image.

2. The biometric authentication apparatus according to claim 1,
wherein the one or more processors are configured to divide a predetermined region of the vein image including the central position of the vein image into the plurality of partial regions.

3. The biometric authentication apparatus according to claim 1,
wherein the one or more processors are configured to arrange the count results in order from a partial region located at a corner of the vein image.

4. The biometric authentication apparatus according to claim 1,
wherein the one or more processors are configured to arrange the count results in order from a partial region including a central position of the vein image.

5. The biometric authentication apparatus according to claim 1,
wherein the one or more processors are configured to perform an authentication processing based on an element of the vein distribution vector corresponding to a partial region including a central position of the vein image.

6. A biometric authentication method comprising:
emitting a light having a predetermined wavelength to a finger portion and extracting a vein image showing positions of veins from an image including veins in the finger portion from which the image has been obtained;
dividing the extracted vein image into a plurality of partial regions;
counting a number of pixels corresponding to the veins in each of the generated partial regions;
arranging, in a predetermined order, count results of the respective partial regions;
generating a vein distribution vector, which is a numerical sequence representing a degree of distribution of the veins in the vein image;
authenticating the generated vein distribution vector based on a registered vein distribution vector, which is a vein distribution vector registered in advance;
calculating a degree of similarity between the generated vein distribution vector and the registered vein distribution vector, while one of the generated vein distribution vector and the registered vein distribution vector is shifted by a predetermined number of elements;
correcting the vein image by performing at least one of a parallel moving processing and a rotation processing on the extracted vein image;
performing a principal component analysis on a not-yet-corrected vein image, and rotating the not-yet-corrected vein image such that a direction of a first principal component is in parallel with a side in a longitudinal direction of the vein image; and
calculating a barycenter of a distribution of pixels corresponding to the positions of the veins in the not-yet-corrected vein image, and moving the not-yet-corrected vein image in parallel such that the barycenter matches a central position of the vein image.

7. A non-transitory computer readable medium having stored thereon, a computer program having at least one code section executable by a computer, thereby causing the computer to perform steps comprising:
emitting a light having a predetermined wavelength to a finger portion and extracting a vein image showing positions of veins from an image including veins in the finger portion from which the image has been obtained;
dividing the extracted vein image into a plurality of partial regions;
counting a number of pixels corresponding to the veins in each of the partial regions;
arranging, in a predetermined order, count results of the respective partial regions;
generating a vein distribution vector, which is a numerical sequence representing a degree of distribution of the veins in the vein image;
authenticating the generated vein distribution vector based on a registered vein distribution vector, which is a vein distribution vector registered in advance;
calculating a degree of similarity between the generated vein distribution vector and the registered vein distribution vector, while one of the generated vein distribution vector and the registered vein distribution vector is shifted by a predetermined number of elements;
correcting the vein image by performing at least one of a parallel moving processing and a rotation processing on the extracted vein image;
performing a principal component analysis on a not-yet-corrected vein image, and rotating the not-yet-corrected vein image such that a direction of a first principal component is in parallel with a side in a longitudinal direction of the vein image; and
calculating a barycenter of a distribution of pixels corresponding to the positions of the veins in the not-yet-corrected vein image, and moving the not-yet-corrected vein image in parallel such that the barycenter matches a central position of the vein image.

* * * * *